(12) United States Patent
Mook et al.

(10) Patent No.: US 12,291,402 B2
(45) Date of Patent: May 6, 2025

(54) SHELF WITH INTEGRATED ROLLER SECUREMENT

(71) Applicant: Fasteners for Retail, Inc., Twinsburg, OH (US)

(72) Inventors: Dean Mook, Medina, OH (US); William H. Walker, Fairlawn, OH (US); Keith C. Eden, Rockford, IL (US); Ashok Kumara Dyavarasegowda, Bangalore (IN); Shane Obitts, North Ridgeville, OH (US)

(73) Assignee: Fasteners for Retail, Inc., Twinsburg, OH (US)

( * ) Notice: Subject to any disclaimer, the term of this patent is extended or adjusted under 35 U.S.C. 154(b) by 126 days.

(21) Appl. No.: 18/184,844

(22) Filed: Mar. 16, 2023

(65) Prior Publication Data
US 2023/0294924 A1 Sep. 21, 2023

Related U.S. Application Data

(60) Provisional application No. 63/269,479, filed on Mar. 17, 2022.

(51) Int. Cl.
*B65G 21/20* (2006.01)
*B65G 13/11* (2006.01)
*B65G 39/12* (2006.01)

(52) U.S. Cl.
CPC .......... *B65G 21/2072* (2013.01); *B65G 13/11* (2013.01); *B65G 39/12* (2013.01)

(58) Field of Classification Search
CPC ..... B65G 21/2072; B65G 13/11; B65G 39/12

USPC ...................................................... 193/35 R
See application file for complete search history.

(56) References Cited

U.S. PATENT DOCUMENTS

| 3,586,142 | A | 6/1971 | Inwood et al. |
| 4,067,428 | A | 1/1978 | Shuttleworth |
| 4,613,036 | A | 9/1986 | Bourgeois |
| 4,681,203 | A | 7/1987 | Kornylak |
| 4,982,835 | A * | 1/1991 | Butler ............... B65G 21/2072 198/860.3 |
| 5,788,090 | A | 8/1998 | Kajiwara |
| 6,196,275 | B1 | 3/2001 | Yazawa et al. |

(Continued)

FOREIGN PATENT DOCUMENTS

| CN | 206548237 U | 10/2017 |
| WO | 2010/108829 A1 | 9/2010 |

OTHER PUBLICATIONS

International Search Report and Written Opinion relating to application PCT/US2023/064525, dated Aug. 10, 2023.

*Primary Examiner* — James R Bidwell
(74) *Attorney, Agent, or Firm* — Honigman LLP

(57) ABSTRACT

A conveyor system includes a conveyor frame having a frame base and a pair of parallel frame sidewalls. Each sidewall extend from a top side of the base to a distal end defining a plurality of sockets. The sockets include a socket bearing configured to support a corresponding roller shaft and a lip element extending across the opening at the distal end. In some examples, the conveyor frame includes at least one end coupler attached at an end of the conveyor frame. In some configurations, the conveyor frame includes a plurality of frame segments each defining a portion of a length of the conveyor frame.

16 Claims, 31 Drawing Sheets

(56) References Cited

U.S. PATENT DOCUMENTS

| | | | |
|---|---|---|---|
| 6,516,933 B1 * | 2/2003 | Ledingham | B65G 21/2054 |
| | | | 193/35 R |
| 6,523,664 B2 | 2/2003 | Shaw et al. | |
| 7,114,606 B2 | 10/2006 | Shaw et al. | |
| 7,200,903 B2 | 4/2007 | Shaw et al. | |
| 7,243,605 B1 * | 7/2007 | Belanger | B60S 3/004 |
| | | | 104/172.1 |
| 8,025,162 B2 | 9/2011 | Hardy | |
| 8,276,772 B2 | 10/2012 | Kim | |
| 8,376,154 B2 | 2/2013 | Sun | |
| 8,573,379 B2 | 11/2013 | Brugmann | |
| 9,220,353 B2 | 12/2015 | Brügmann | |
| 11,064,816 B2 | 7/2021 | Sun | |
| 11,229,302 B2 | 1/2022 | Ciesick | |
| 11,254,505 B2 | 2/2022 | Sun et al. | |
| 2004/0178156 A1 | 9/2004 | Knorring et al. | |
| 2006/0108204 A1 | 5/2006 | Marsetti | |
| 2008/0110720 A1 | 5/2008 | Ross et al. | |
| 2021/0059434 A1 | 3/2021 | Ciesick | |
| 2021/0321791 A1 | 10/2021 | Sun | |
| 2022/0097972 A1 | 3/2022 | Sun, Jr. et al. | |

* cited by examiner

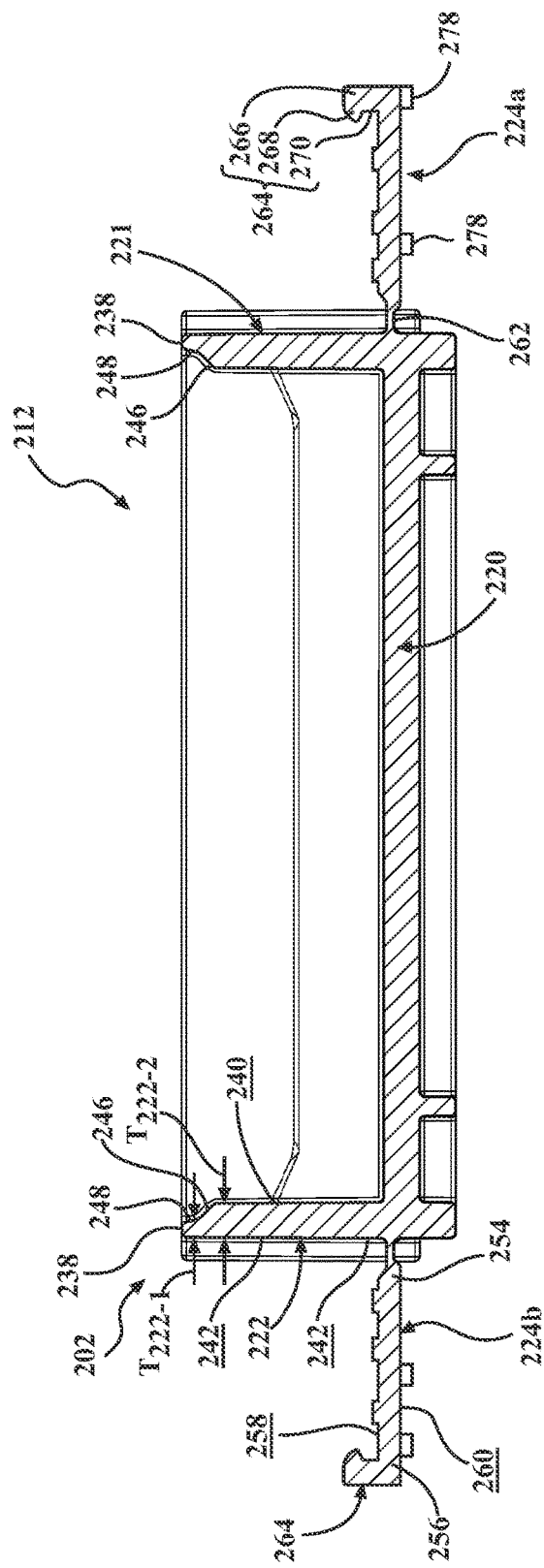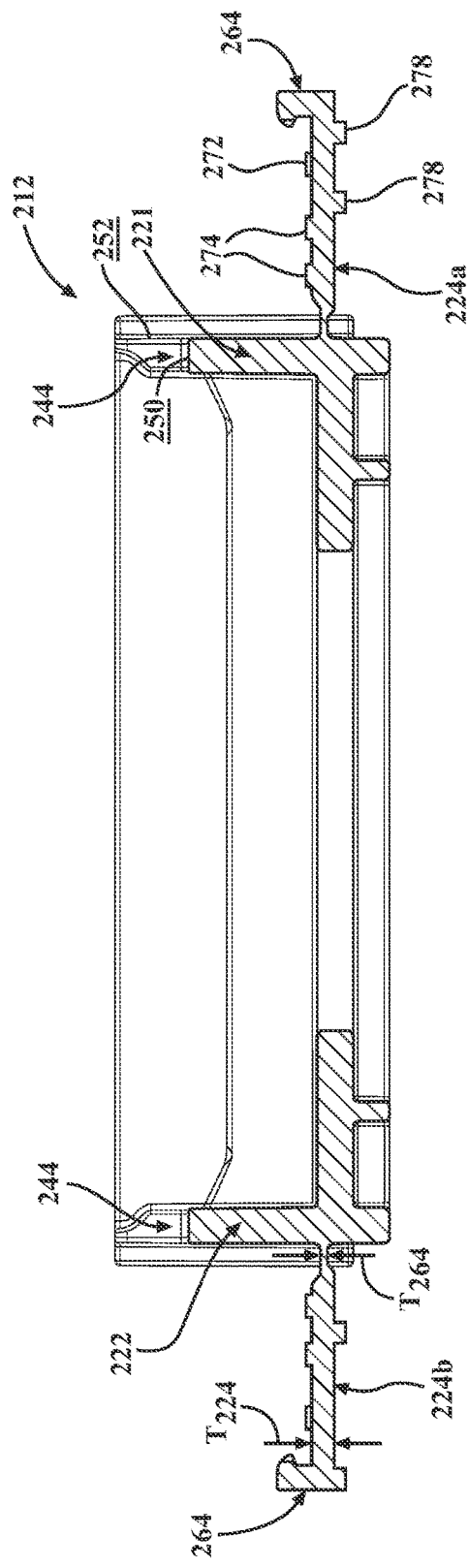

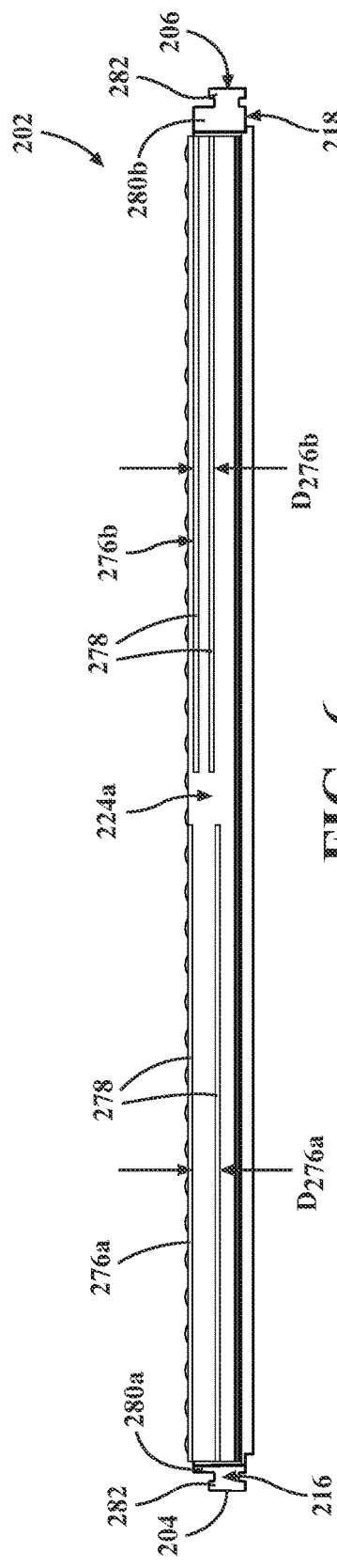
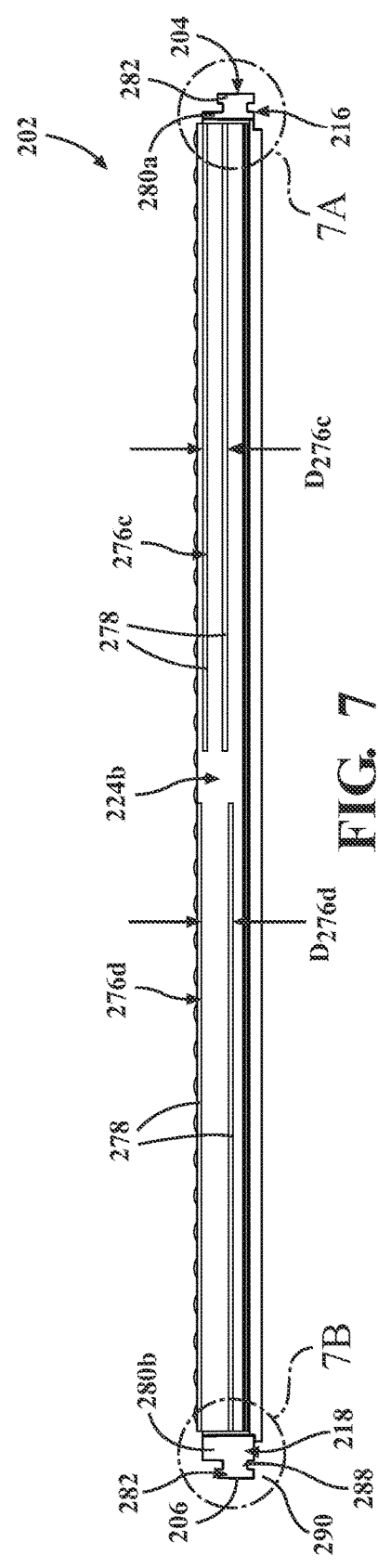
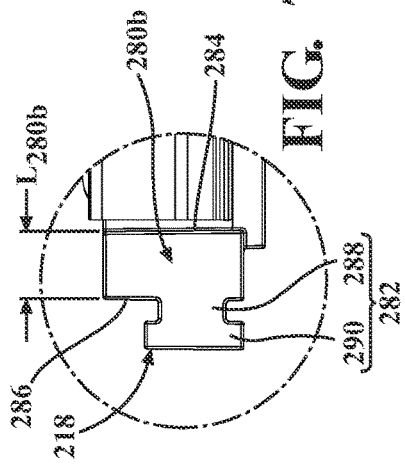
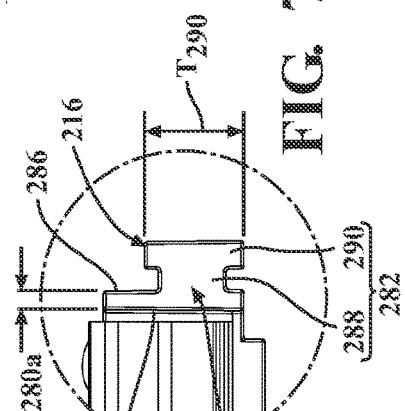

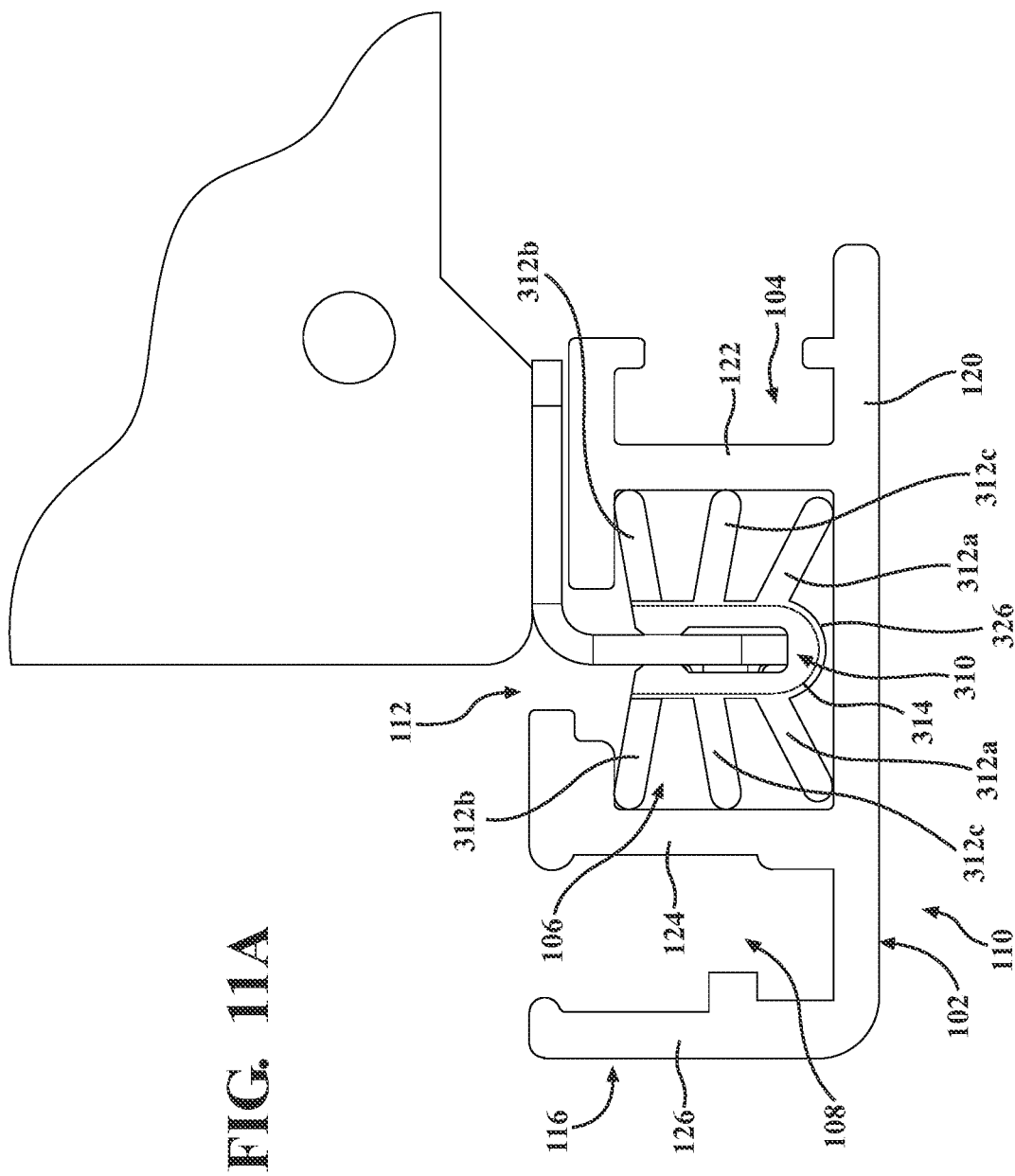

SHELF WITH INTEGRATED ROLLER SECUREMENT

CROSS REFERENCE TO RELATED APPLICATIONS

This application claims priority under 35 U.S.C. § 119(e) to U.S. Provisional Application 63/269,479, filed on Mar. 17, 2022. The disclosure of this prior application is considered part of the disclosure of this application and is hereby incorporated by reference in its entirety.

TECHNICAL FIELD

This disclosure relates to retail shelving with integrated roller securement.

BACKGROUND

Gravity-fed shelving systems are commonly used in retail environments as an efficient means of ensuring that products are continuously presented at the front-most area of a shelving system. For instance, when a retail customer or user removes a product from the front of the shelving system, a subsequent product that is stocked on the shelf automatically transitions to the front of the shelf under the influence of gravity. Such shelving ensures that product inventory is always presented for purchase.

Conventional gravity-fed shelving systems sometimes utilize a conveying system that allows the products to translate along the shelving under the influence of gravity. For instance, some shelving systems may include a support bed having a series of rollers arranged along a length of the support bed. Retail products are loaded into the shelving system such that the rollers facilitate natural translation of the retail products along the length of the support bed towards a lower end of the shelving system.

Over a period of use, rollers used in gravity-fed shelving systems may need to be removed for maintenance or replacement as the condition of the bearings and other components of each roller deteriorate. Accordingly, there exists a need in the art for a gravity-fed shelving system that allows for convenient replacement or maintenance of rollers while ensuring that the rollers remain securely installed within the shelving system during use.

SUMMARY

An aspect of the disclosure provides a conveyor system for a retail shelf. The conveyor system includes a conveyor frame having a frame base and a pair of parallel frame sidewalls. Each sidewall extend from a top side of the base to a distal end defining a plurality of sockets. The sockets include a socket bearing configured to support a corresponding roller shaft and a lip element extending across the opening at the distal end.

Implementations of the disclosure may include one or more of the following optional features. In some examples, the conveyor frame includes at least one end coupler attached at an end of the conveyor frame. In these examples, the end coupler includes at least one coupler ear integrally formed with one of the sidewalls and coupler base integrally formed with the frame base, with the coupler ear being independent from the coupler base. The conveyor system may additionally include a track system including a track member slidably couples to the end coupler. In some configurations, the conveyor frame includes a plurality of frame segments each defining a portion of a length of the conveyor frame. The plurality of segments may include a first end segment extending from a first end including the end coupler to a second end defined by the frame base and the frame sidewall and a second end segment extending from a third end including a frame coupler configured to overlap the second end of the first end segment when the conveyor frame is in an assembled state.

In some implementations, the conveyor system includes the lip element that is recessed from an inner sidewall surface of each of the sidewalls. In these implementations, the lip element may be arcuate. In some examples, the conveyor frame includes a first end including a first track coupling member. In some configurations, the conveyor system includes a plurality of roller units that each include a first roller shaft at a first end and a second roller shaft at an opposite second end. The length from the first end to the second end is greater than a distance between a first lip element on a first one of the frame sidewalls and a second lip element on the other one of the frame sidewalls.

Another aspect of the disclosure provides a conveyor system for a retail shelf including a conveyor chassis with a base and a chassis sidewall extending a first height from the base. The conveyor system also includes a frame sidewall formed separately from the chassis and including a proximal end defining a sidewall channel configured to receive the chassis sidewall and an opposite distal end including a plurality of sockets.

Implementations of the disclosure may include one or more of the following optional features. In some examples, the conveyor chassis includes a plurality of receptacles formed in at least one of the base and the chassis sidewall. In these examples, the frame sidewall may have a plurality of tabs configured to be at least partially received within the receptacles when the channel of the frame sidewall receives the chassis sidewall. The tabs may have a sidewall retainer configured to engage the chassis at one of the receptacles. In some examples, the chassis includes a base retainer configured to interface with the sidewall retainer. In some implementations, the base retainer includes a flange extending from a top side of the base.

In some configurations, the conveyor system includes a base that is a metallic material and the frame sidewall includes a polymeric material. In some implementations, the frame includes at least one end coupler attached at an end of the conveyor frame. In these implementations, the end coupler includes at least one coupler ear integrally formed with one of the sidewalls and coupler base integrally formed with the frame base, with the coupler ear being independent from the coupler base. The conveyor system may also have a track system including a track member slidably coupled to the end coupler.

Another aspect of the disclosure provides a conveyor system for a retail shelf. The conveyor system includes a conveyor frame having a first sidewall. The first sidewall includes a distal end defining a plurality of sockets. The conveyor system further includes a first wing operable between an open configuration, wherein the sockets of the first sidewall are exposed, and a closed configuration, wherein the sockets of the first sidewall are covered by the first wing.

Implementations of the disclosure may include one or more of the following optional features. In some implementations, the first wing includes a lower end coupled to the first sidewall and an upper end operable to selectively cover the sockets of the first sidewall when the first wing is moved between the open configuration and the closed configuration. In some examples, the upper end of the first wing includes a flange configured to engage the distal end of the first sidewall in the closed configuration. In some configurations, the flange is configured to receive the distal end of the first sidewall. In some examples, the lower end of the first wing is hingedly coupled to the first sidewall. In some implementations, the lower end of the first wing is coupled to the first sidewall by a living hinge.

In some configurations the first sidewall and the first wing are integrally formed. In some implementations, the first wing includes an outer surface configured to face away from the first sidewall in the closed configuration, the outer surface including at least one rib extending parallel to the distal end of the first sidewall. In some examples, the conveyor frame includes a first end, including a first track coupling member. In some configurations, a plurality of roller units each including a first roller shaft received by one of the sockets of the first sidewall, wherein the first roller shaft is disposed between the first wing and the first sidewall when the first wing is in the closed configuration.

Another aspect of the disclosure provides a shelf divider system. The shelf divider system, including a divider track, including a first slot extending along a length of the divider track. The shelf divider system further includes a track insert received within the first slot and including an inner core defining a lower socket and a plurality of stabilizers extending outwardly from the inner core.

This aspect may include one or more of the following optional features. In some configurations, each of the stabilizers extends to a distal end contacting an inner surface of the first slot. In some examples, the inner core includes a first material and the stabilizers include a second material that is different than the first material. In some implementations, the second material has at least one of a greater coefficient of friction or a lower stiffness than the first material.

In some configurations, the first slot includes a first slot opening formed in a top side of the first divider track. In some examples, the lower socket includes a lower socket opening exposed through the first slot opening. In some implementations, the lower socket has a first width and the lower socket opening has a second width that is less than the first width. In some configurations, a divider including a divider wall and a divider coupling tab extending from a bottom side of the divider wall, the divider coupling tab configured to selectively engage with the lower socket of the track insert through the first slot. In some examples, the divider coupling tab includes a distal end having a third width that is greater than a width of the lower socket.

In some implementations, the track insert is configured to expand within the first slot when the divider coupling tab is engaged with the lower socket of the track insert.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5A is a cross-sectional view of the conveyor unit shown in FIG. 2, taken along Line 5A-5A in FIG. 2.

FIG. 5B is a cross-sectional view of the conveyor unit shown in FIG. 2, taken along Line 5B-5B in FIG. 2.

FIG. 6 is a first side elevation view of the conveyor unit of FIG. 2.

FIG. 7 is a second side elevation view of the conveyor unit of FIG. 2.

FIG. 7A is an enlarged view of a first end of the conveyor unit of FIG. 2, taken at Area 7A of FIG. 7.

FIG. 7B is an enlarged view of the conveyor unit of FIG. 2, taken at Area 7B of FIG. 7.

FIG. 11A is an enlarged fragmentary view of the divider system and track system of FIG. 8, taken at Area 11A.

Like reference symbols in the various drawings indicate like elements.

DETAILED DESCRIPTION

Figure 1:
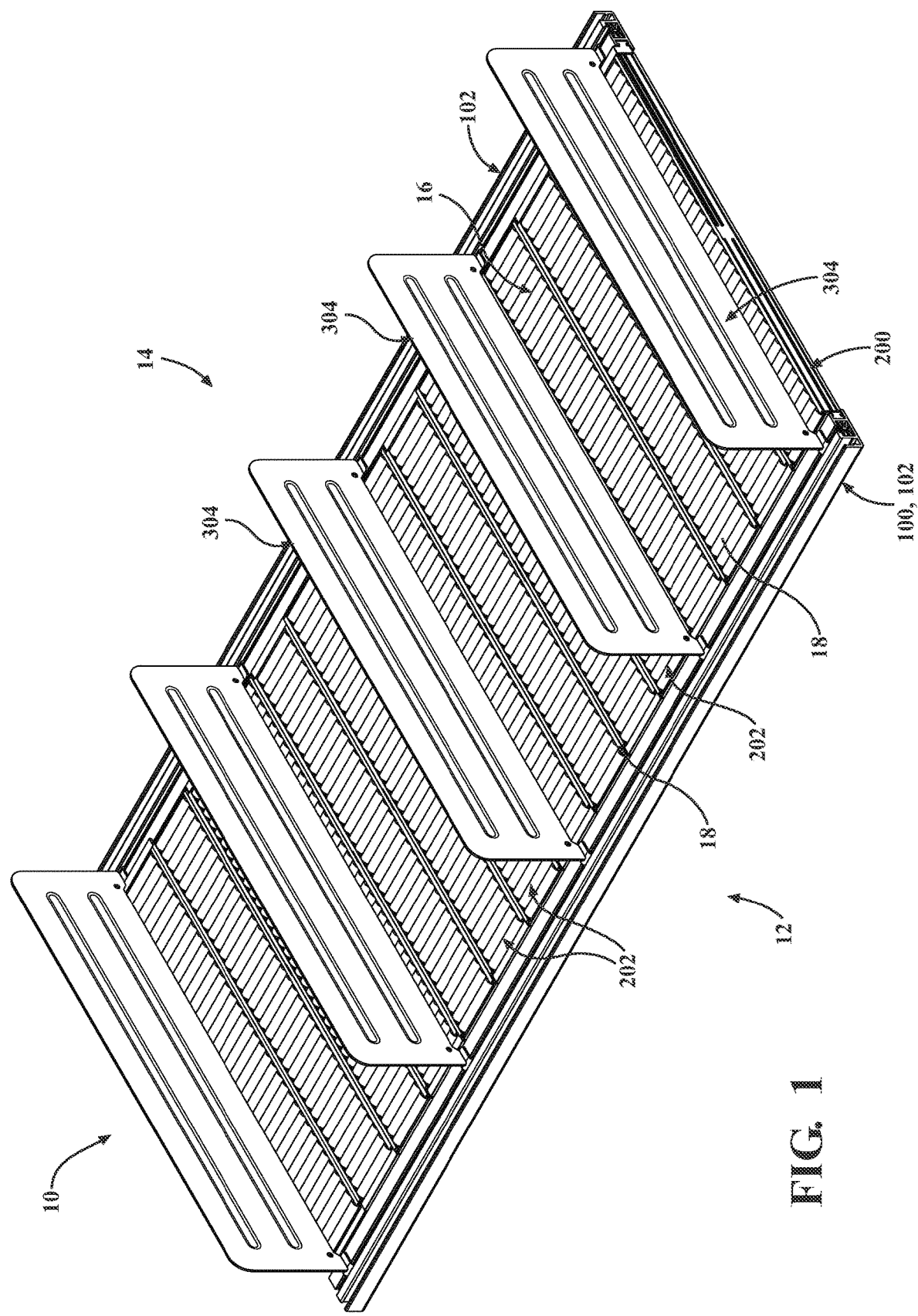
FIG. 1 is perspective view of an example shelving system according to the principles of the present disclosure.

Referring to FIG. 1, a shelving system 10 is shown including a track system 100, a conveyor system 200, and a divider system 300 according to an example of the present disclosure. As described throughout the application, the shelving system 10 and components thereof may be described with reference to a front side 12 corresponding to a product dispensing location that may face a store aisle and a rear side 14 formed on the opposite side of the shelving system 10 from the front side 12. Furthermore, the shelving system 10 and components thereof may be described relative to a longitudinal direction or axis extending from the front side 12 to the rear side 14 or a lateral direction or axis extending perpendicular to the longitudinal direction.

The shelving system 10 may be provided as a standalone unit for use in a retail environment, or may be provided in combination with a plurality of the shelving systems 10. Furthermore, the shelving system 10 may be configured for direct attachment to one or more shelving support members (not shown), such as uprights or walls, or alternatively, may be installed on existing shelves. Optionally, the shelving system 10 may be provided as a gravity-fed shelving system 10, whereby the shelving system 10 is oriented at an oblique angle relative to level such that a support bed 16 of the shelving system forms a decline from the rear side 14 of the shelving system 10 to the front side 12 of the shelving system 10.

Generally, the track system 100 includes a pair of track members 102 each defining one or more of a conveyor track 104, a divider track 106, and/or an accessory track 108 (FIG. 11A). The conveyor system 200 of the shelving system 10 includes one or more conveyor units 202 collectively defining the support bed 16 of the shelving system 10. In the illustrated example, the conveyor system 200 includes a plurality of the conveyor units 202 attached to the track system 100 such that the conveyor units 202 cooperate to define the support bed 16 of the shelving system 10. The divider system 300 includes at least one divider unit 304 selectively coupled to the divider track 106 of each of the track members 102. As described in greater detail below, the divider system 300 includes an attachment interface between each divider track 106 and a respective one of the divider units 304 to allow each of the divider units 304 to be selectively attached to and adjusted along each divider track 106. Thus, divider units 304 can be added, removed, or repositioned along the divider tracks 106 to define a plurality of independent product bays 18 for arranging and separating products.

With reference to FIG. 1, the shelving system 10 includes the track system 100 generally configured to facilitate attachment and lateral translation of the various components of the conveyor system 200 and the divider system 300. Here, the track system 100 includes a pair of the track members 102, with a first track member 102 extending along the front side 12 and a second track member 102 extending along the rear side 14. While the track members 102 of the present disclosure are shown as being identical, in some examples one of the track members 102 may be different. For example, one of the track members 102 may be provided without the accessory track 108.

Figure 10:
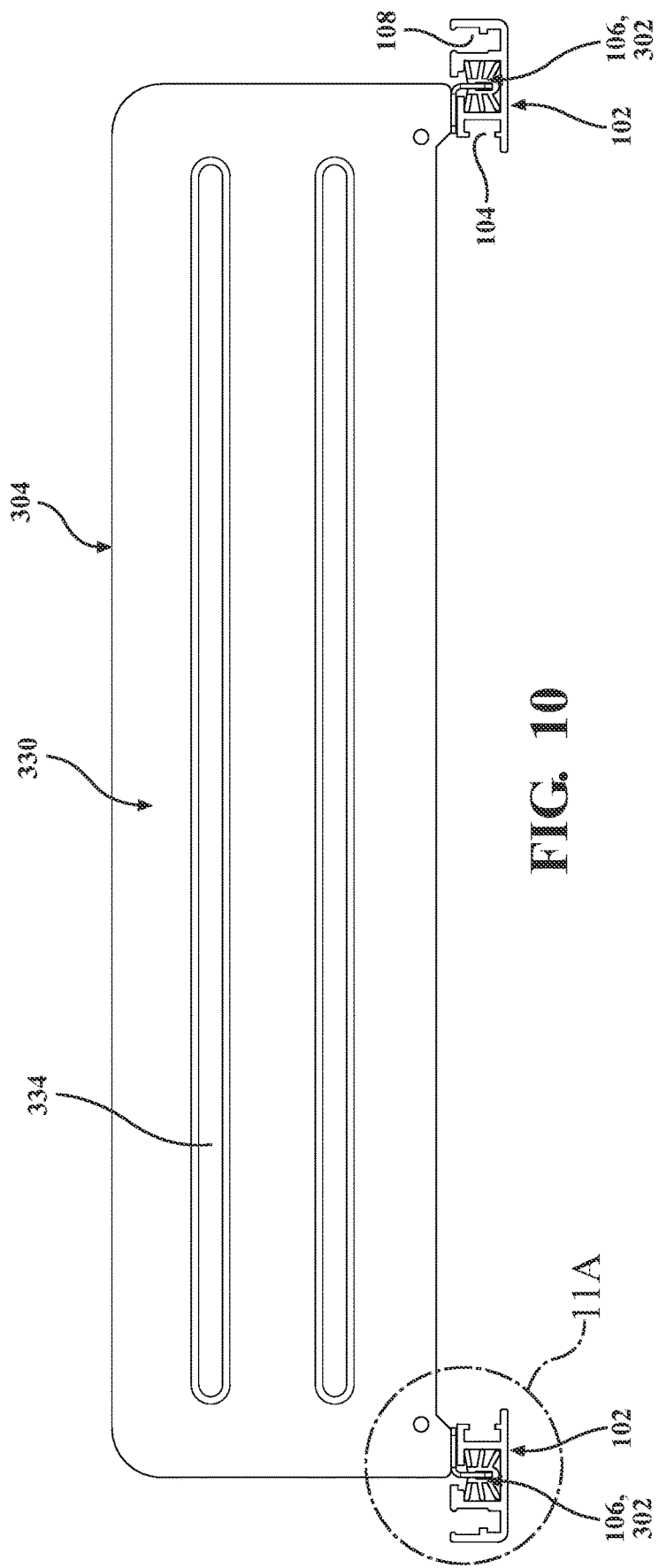
FIG. 10 is a side elevation view of the divider system and track system of FIG. 8.
Figure 11B:
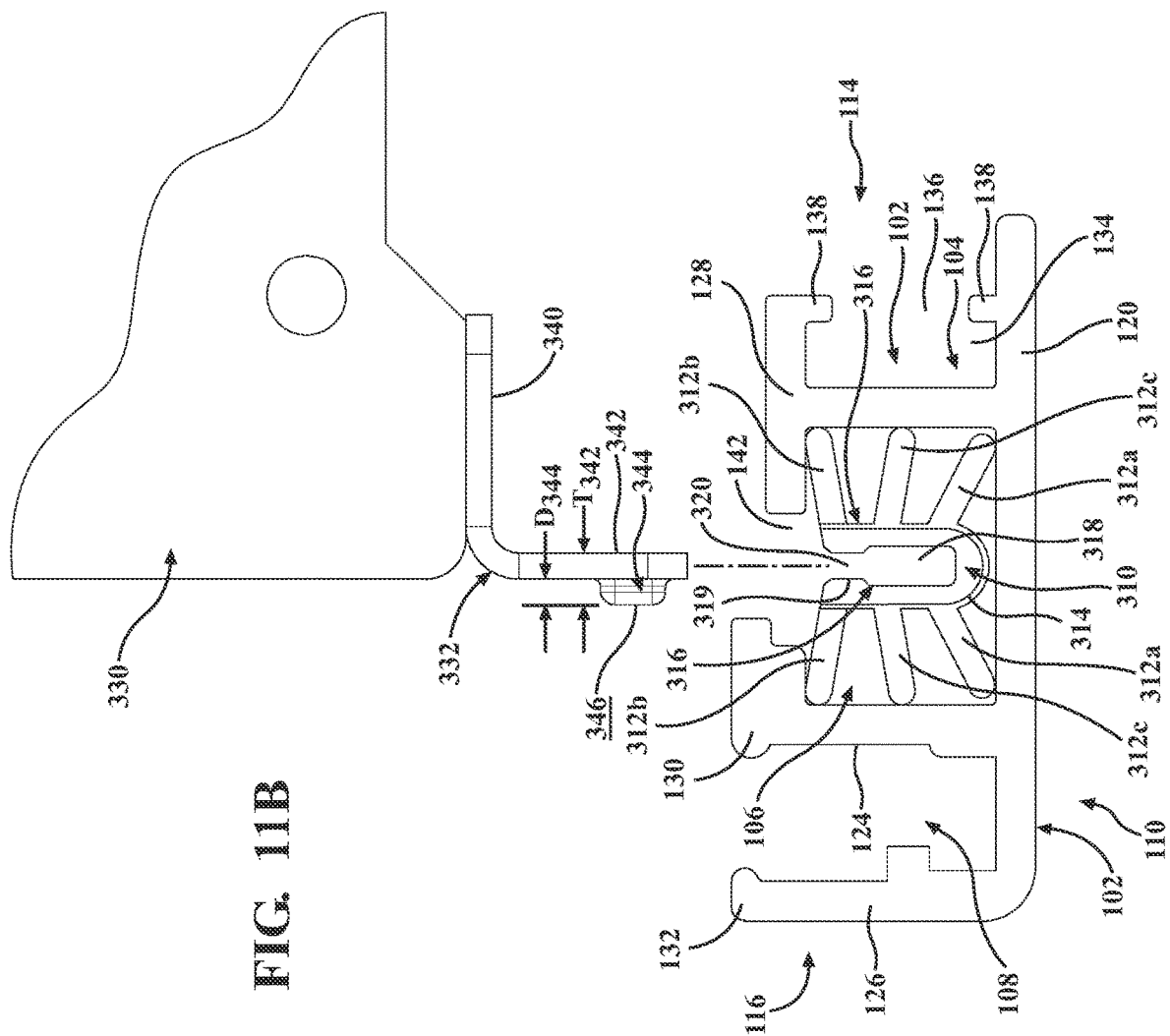
FIG. 11B is an enlarged fragmentary view of the divider system and track system of FIG. 8, taken at Area 11B.

Referring to FIGS. 10-11B, each track member 102 includes the conveyor track 104, the divider track 106, and the accessory track 108. For the sake of description, each track member 102 and elements thereof may be described relative to a bottom side 110, a top side 112, an inner side 114 configured to face inward (i.e., towards the opposite track member 102) and an outer side 116 configured to face outward (i.e., away from the opposite track member 102). While the track members 102 illustrated in the figures are provided as integral units including all of the tracks 104, 106, 108 formed of a single piece, one or more of the tracks 104, 106, 108 may be provided as a detachable element. Furthermore, the track member 102 may be formed with any one of or any combination of the tracks 104, 106, 108. For example, the track member 102 may be provided with just the conveyor track 104 or just the divider track 106.

The track member 102 includes a base member 120 disposed along the bottom side 110 and a plurality of track walls 122, 124, 126 extending from the top side of the base member 120. The track walls 122, 124, 126 cooperate with each other to define the respective conveyor track 104, divider track 106, and accessory track 108. For example, the track walls 122, 124, 126 include an inner track wall 122 extending from the base member 120 adjacent to the inner side 114 of the track member 102 and partly defining the conveyor track 104, an intermediate track wall 124 spaced apart from and cooperating with the inner track wall 122 to define the divider track 106, and an outer track wall 126 extending from the base member 120 at the outer side 116 and cooperating with the intermediate track wall 124 to define the accessory track 108. Each of track walls 122, 124, 126 may include a respective end cap or retainer 128, 130, 132 formed at the distal end of the track wall 122, 124, 126 and configured to partially define the geometry of one of the respective tracks 104, 106, 108.

The conveyor track 104 of the track member 102 is formed as a T-slot configured to receive a corresponding T-shaped coupler rail 282 of the conveyor system 200 along the inner side 114 of the track member 102. Here, the T-slot includes a head portion 134 having a first height and a narrowed neck portion 136 having a second height that is less than the first height of the head portion 134. The neck portion 136 defines an opening of the T-slot and faces toward the inner side 114 of the track member 102. Here, the neck portion 136 is defined between an opposing pair of ribs 138 including a first rib 138 extending upwardly from the top side of the base member 120 and a second rib 138 extending downwardly from a distal end of an inner track wall retainer 128 formed at the distal end of the inner track wall 122.

The divider track 106 is disposed in an intermediate portion of the track member 102 and is defined by the base member 120, the inner track wall 122, the intermediate track wall 124, and the respective retainers 128, 130 of the inner track wall 122 and the outer track wall 124. Here, the divider track 106 is also formed as a T-slot along the top side 112 of the track member 102. The divider track 106 includes a head portion 140 having a first width formed between the inner track wall 122 and the intermediate track wall 124 and a neck portion 142 having a second width defined between opposing ends of the retainers 128, 130 that is less than the first width. As discussed in greater detail below, the divider track 106 is configured to receive and retain a divider coupling tab 332 in the head portion 140 while allowing the divider coupling tab 332 to be selectively inserted through an opening defined by the neck portion 142.

The accessory track 108 is formed adjacent to the outer side 116 of the track member 102 and is defined by the base member 120, the intermediate track wall 124, the outer track wall 126, and the retainers 130, 132 formed on the respective track walls 124, 126. The accessory track 108 is optional and may be configured to accept various shelving accessories, such as label holders, security devices, product displays, or the like. In the illustrated example, the accessory track 108 includes an opening formed along the top side 112 of the track member 102. The accessory track 108 may include one or more ribs or other features configured to interface with corresponding features of an accessory (e.g., a label holder) and to allow the accessory to translate along the lateral direction within the accessory track 108.

Figure 2:
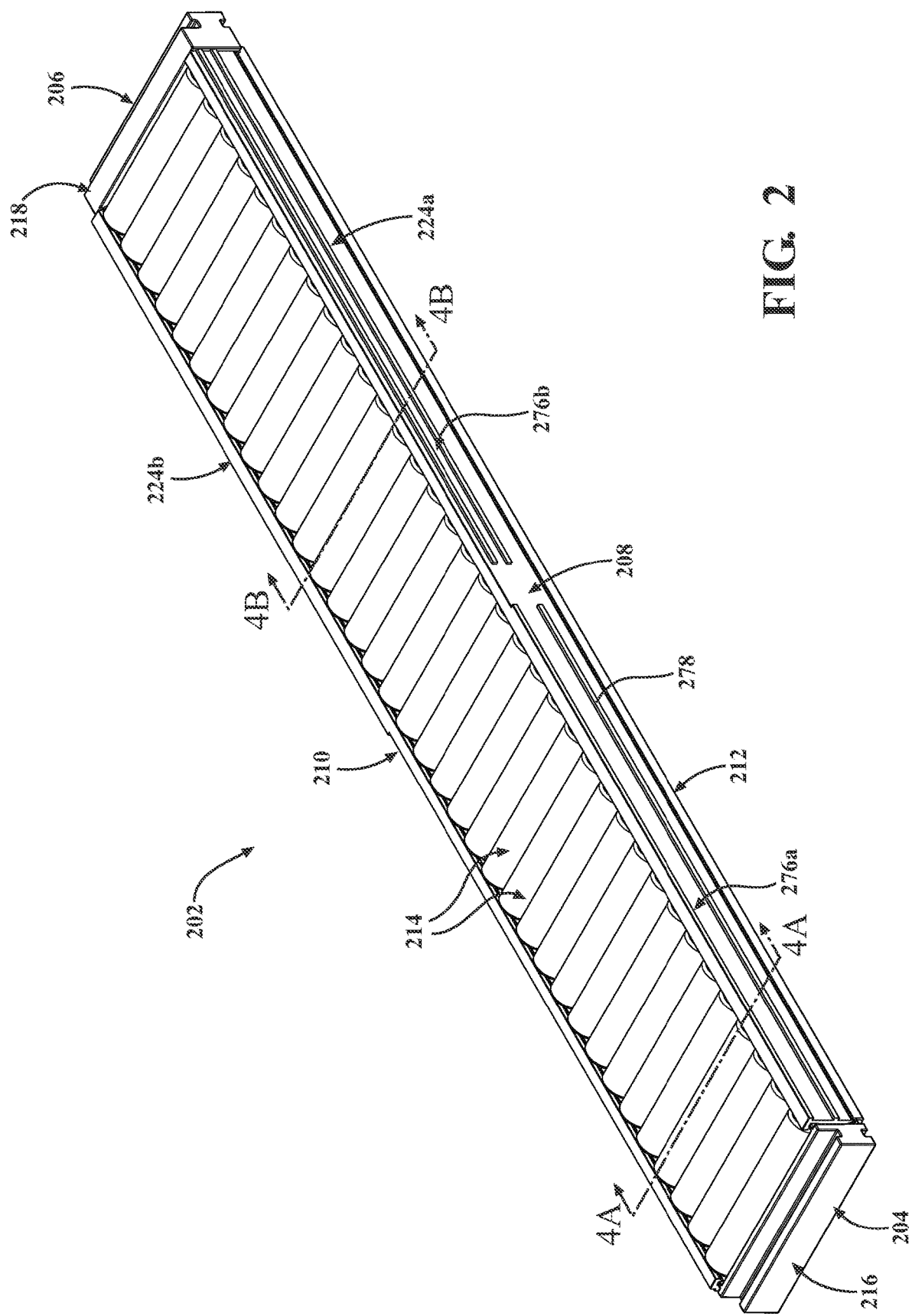
FIG. 2 is a perspective view of an example conveyor unit for use according to the principles of the present disclosure.

Referring now to FIG. 2, an example of one of the conveyor units 202 of the conveyor system 200 is provided. Each conveyor unit 202 may be described as having a longitudinal axis extending from a first end 204 to a second end 206. Thus, a length of each conveyor unit 202 is defined by a distance from the first end 204 to the second end 206. Additionally, each conveyor unit 202 includes a first side 208 extending between the first end 204 and the second end 206 and a second side 210 formed on an opposite side from the first side 208 and extending between the first end 204 and the second end 206. A width of each conveyor unit 202 is defined by the distance from the first side to the second side.

The conveyor unit 202 includes a conveyor frame 212 extending along the lengthwise direction of the conveyor unit 202 and a plurality of rollers 214 attached to the conveyor frame 212. Generally, the plurality of rollers 214 are arranged in series between the first end 204 and the second end 206 of the conveyor unit 202 such that rotational axes of the rollers 214 are parallel to each other and extend between the first side 208 and the second side 210, thereby defining a continuous support bed 16. The conveyor unit 202 further includes a first end coupler 216 attached to the conveyor frame 212 at the first end 204 and a second end coupler 218 attached to the conveyor frame 212 at the second end 206. As discussed in greater detail below, the first end coupler 216 and the second end coupler 218 extend different lengths from the ends 204, 206 of the conveyor system 200 such that the conveyor frame 212 is offset (i.e., not centered) towards the first end 204 of the conveyor unit 202.

Referring to FIGS. 3-5B, the conveyor frame 212 includes a base 220, a first sidewall 221 extending from a first side of the base 220, and a second sidewall 222 extending from a second side of the base 220 on an opposite side of the conveyor frame 212 than the first sidewall 221. The base 220 and each of the sidewalls 221, 222 extend continuously along a length of the conveyor unit 202 from the first end 204 to the second end 206. The conveyor frame 212 further includes a first wing 224a attached to the conveyor frame 212 on the first side 208 and a second wing 224b attached to the conveyor frame 212 on the second side 210. As described below, each of the wings 224a, 224b are operable between a first position (FIG. 2) and a second configuration (FIG. 3) to selectively secure the rollers 214 within the conveyor frame 212.

Figure 4A:
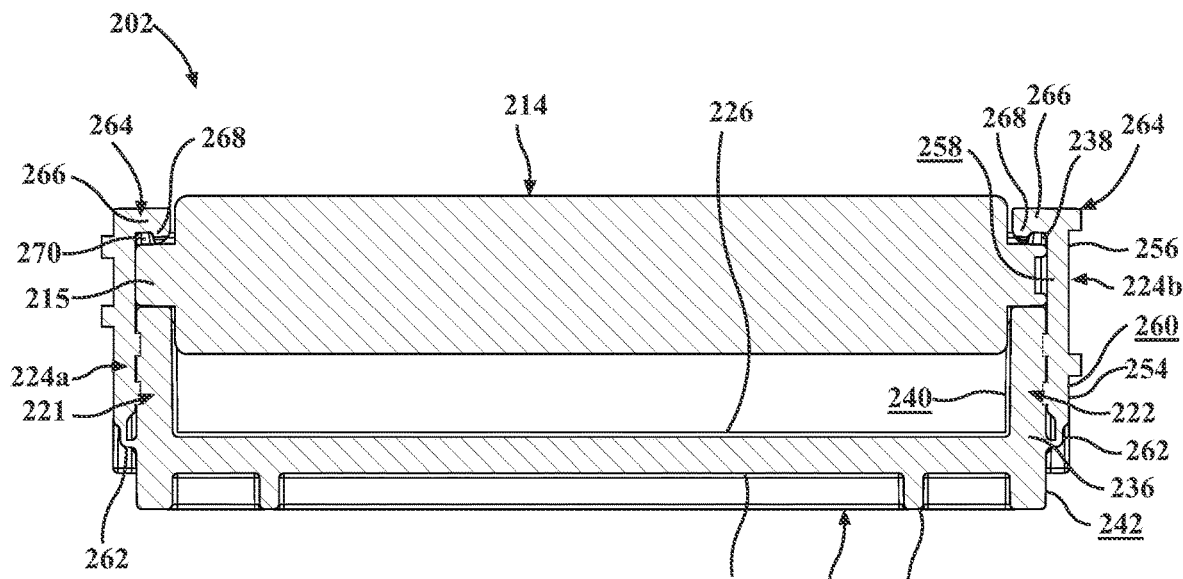
FIG. 4A is a cross-sectional view of the conveyor unit shown in FIG. 2, taken along Line 4A-4A in FIG. 2.
Figure 4B:
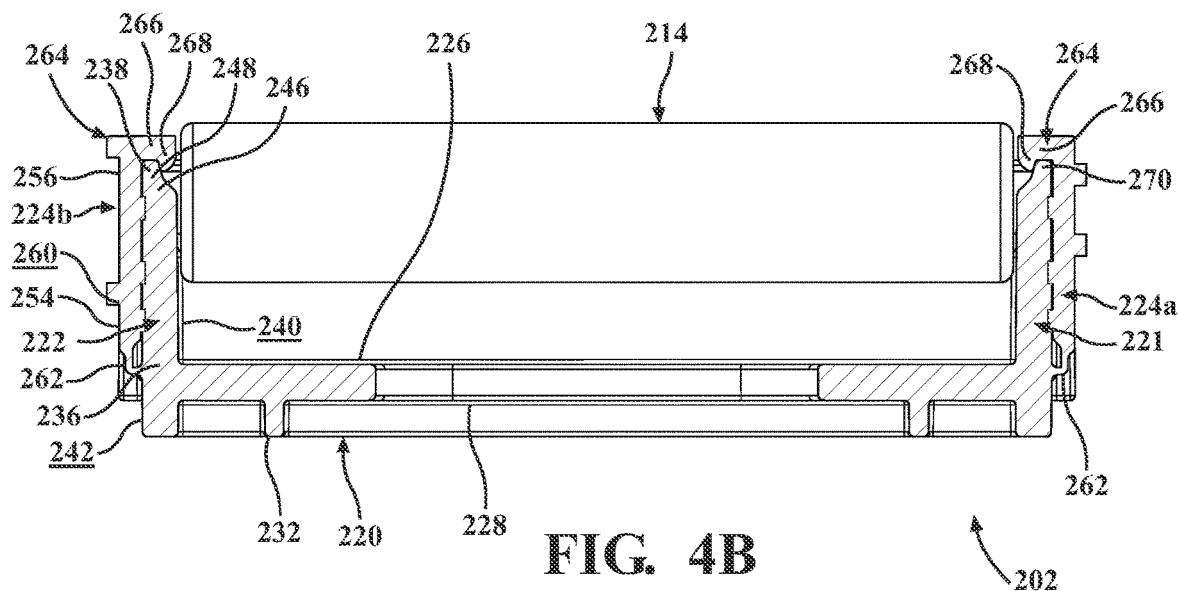
FIG. 4B is a cross-sectional view of the conveyor unit shown in FIG. 2, taken along Line 4B-4B in FIG. 2.
Figure 8:
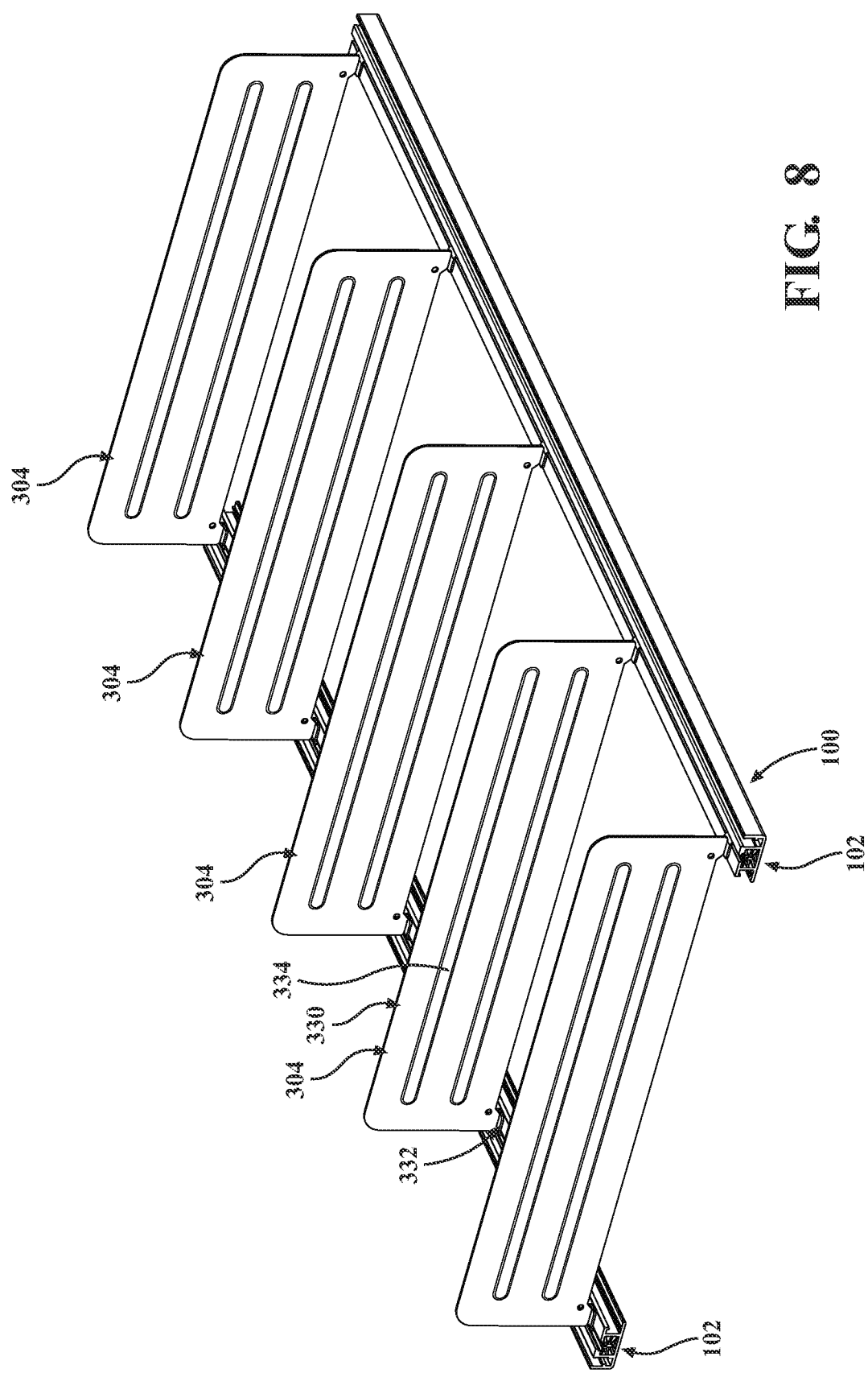
FIG. 8 is a perspective view of a divider system and track system according to the principles of the present disclosure.

Referring to FIG. 4A, the base 220 includes a top side 226 and a bottom side 228 formed on an opposite side of the base 220 from the top side 226. Optionally, the bottom side 228 of the base 220 may include a network of lower support ribs 232 extending from the bottom side 228. The lower ribs 232 serve as both a bottom support structure for the conveyor unit 202 and a stiffening structure for the conveyor unit 202. In some examples, the ribs 232 may be arranged as a grid pattern including longitudinal ribs 232 extending from the first end 204 to the second end 206 and lateral ribs 232 extending between the first side 208 and the second side 210 and connecting the longitudinal ribs 232. The base 220 may further include a plurality of openings 234 formed through a thickness of the base 220 from the top side 226 to the bottom side 228. When included, the openings 234 may be arranged in series along the length of the conveyor frame 212.

Each of the sidewalls 221, 222 extends from a proximal or lower end 236 attached to the base 220 to an upper or distal end 238 extending away from the base 220. In other words, each sidewall 221, 222 has a height extending from the top side 226 of the base 220 to the distal end 238. Generally, the distal end 238 of each sidewall 221, 222 is configured to receive the rollers 214 and to engage or interface with a corresponding one of the wings 224a, 224b to secure the rollers 214 in the conveyor frame 212. Each sidewall 221, 222 may be further described has having a width or thickness extending from an inner sidewall surface 240 (i.e., facing the other sidewall 221, 222) and an outer sidewall surface 242 formed on an opposite side from the inner sidewall surface 240.

Figure 3:
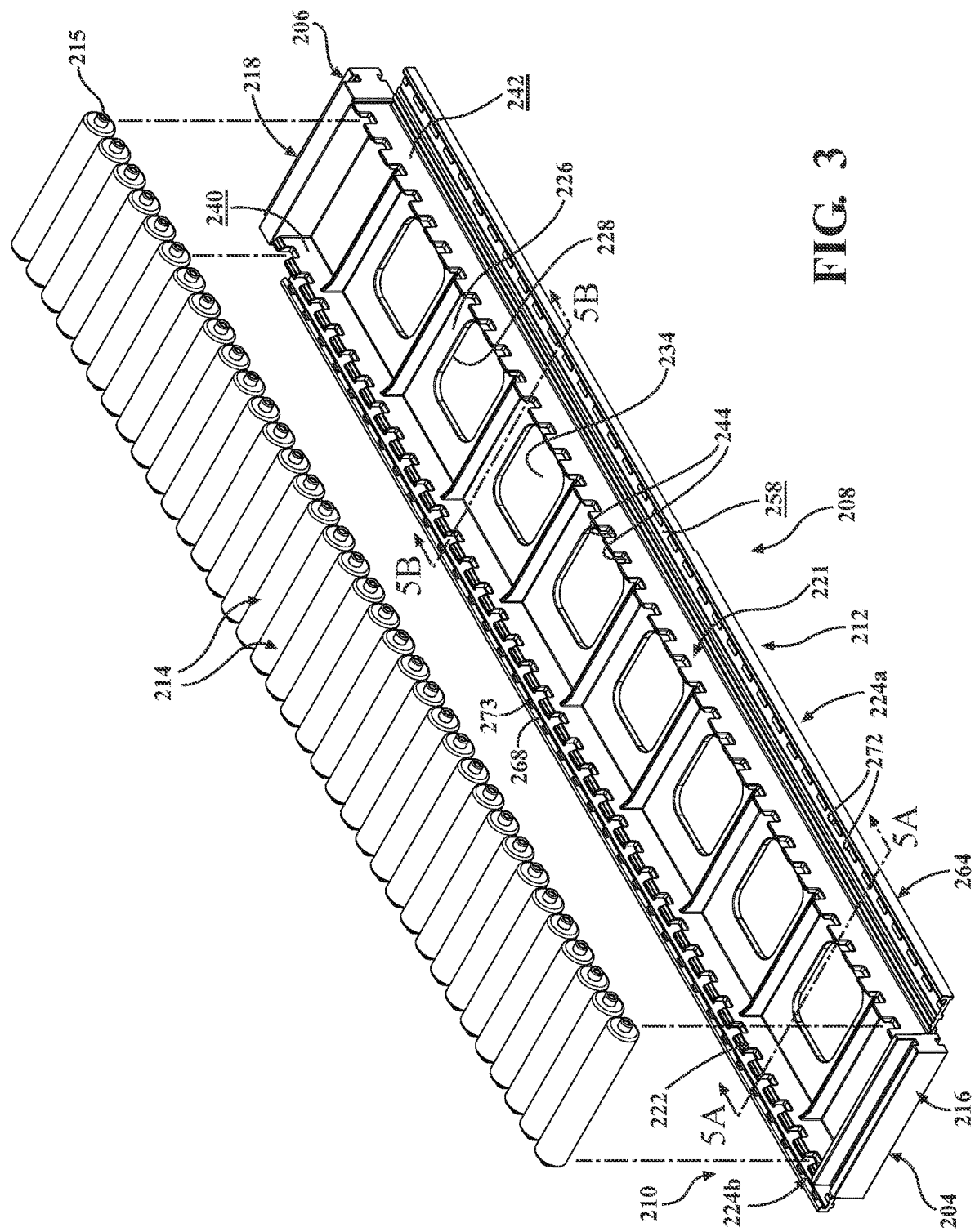
FIG. 3 is an exploded perspective view of the conveyor unit of FIG. 2.

Referring still to FIG. 3, the distal end 238 of each sidewall 221, 222 includes a plurality of lower sockets 244 arranged in series from the first end 204 to the second end 206 of the conveyor unit 202. Each of the lower sockets 244 is generally configured to receive a shaft 215 or axle of one of the rollers 214 when the rollers 214 are installed in the conveyor frame 212 (FIG. 4A). In the illustrated example, each of the lower sockets 244 defines a rectangular notch in the distal end 238 of the sidewall 221, 222. More specifically, each lower socket 244 includes a bottom surface 250 parallel to the top side 226 of the base 220 and an opposing pair of side surfaces 252 extending from the bottom surface 250 to the distal end 238. The rectangular configuration of the lower sockets 244 provides a universal fit capable of accommodating rollers 214 having different axle shapes (e.g., round, polygonal). In the illustrated example, the lower sockets 244 are evenly spaced along the length of each sidewall 221, 222 and the spacing is selected to provide a desired spacing between adjacent ones of the rollers 214.

As best shown in FIGS. 4A-5B, the distal end 238 of each sidewall 221, 222 has a generally tapered profile between adjacent ones of the lower sockets 244. Here, the distal end 238 is configured to interface with a corresponding profile of one of the wings 224a, 224b when the wing 224a, 224b is in the closed configuration (FIGS. 4A and 4B). As shown in FIG. 4A, the sidewall 221, 222 has a substantially constant first thickness $T_{221\text{-}1}$ between the lower end 236 and the distal end 238 and a second thickness $T_{221\text{-}2}$ at the distal end 238. In the illustrated example, the distal end 238 includes a taper from the first thickness $T_{221\text{-}1}$ of the sidewall 221, 222 to the second thickness $T_{221\text{-}2}$. Optionally, the taper may include a compound taper defining an inner shoulder 246 having a first taper rate extending from the first thickness $T_{221-1}$ and a neck 248 extending from the inner shoulder 246 and having a second taper rate between the inner shoulder 246 and the second thickness $T_{221-1}$. The tapered profile, and more specifically the compound taper advantageously provides a gradual transition from the first thickness $T_{221-1}$ to the secondo thickness $T_{221-2}$ and minimizes localized stresses. However, in some examples, the distal end 238 could be formed with a stepped profile (i.e., no taper) from the first thickness $T_{221-1}$ to the second thickness $T_{122}$.

With continued reference to FIG. 3, the first wing 224a is attached to the outer sidewall surface 242 of the first sidewall 221 and the second wing 224b is attached to the outer sidewall surface 242 of the second sidewall 222. Each of the wings 224a, 224b is operable between a closed configuration (FIGS. 4A-4B) wherein the wing 224a, 224b captures or secures the rollers 214 within the lower sockets 244 and an open configuration (FIGS. 5A-5B) wherein the lower sockets 244 are exposed for installation and removal of the rollers 214.

Each wing 224a, 224b includes a lower end 254 attached to the conveyor frame 212 and an upper end 256 operable to move between a first position in the closed configuration and a second position in the open configuration. For example, the lower end 254 may be hingedly coupled to the outer sidewall surface 242 of one of the sidewalls 221, 222 such that the wing 224a, 224b pivots about the lower end 254 to allow the upper end 256 to move between the first position and the second position. Each wing 224a, 224b further includes an inner wing surface 258 that faces the outer sidewall surface 242 when the wing 224a, 224b is in the closed configuration and an outer wing surface 260 formed on an opposite side of the wing 224a, 224b from the inner wing surface 258. Each of the inner wing surface 258 and the outer wing surface 260 generally extend from the lower end 254 to the upper end 256 such that a distance between the inner wing surface 258 and the outer wing surface 260 defines a thickness $T_{224}$ of the wings 224a, 224b.

The conveyor frame 212 may include a hinge 262 connecting the lower end 254 of each wing 224a, 224b to the outer sidewall surface 242. As best shown in FIGS. 4A-5B, the hinge 262 is provided as a living hinge 262 integrally formed with the sidewall 221, 222 and the corresponding wing 224a, 224b. Here, the hinge 262 includes a reduced thickness $T_{262}$ relative to the thickness $T_{224}$ of the wings 224a, 224b. Accordingly, the hinge 262 facilitates movement of the wing 224a, 224b between the open configuration and the closed configuration by flexing or bending along the longitudinal direction of the conveyor frame 212.

With continued reference to FIGS. 4A-5B, the upper end 256 of each wing 224a, 224b includes a closure 264 configured to interface with or engage the distal end 238 of the corresponding sidewall 221, 222 when the wing 224a, 224b is in the closed configuration. Additionally, when the wing 224a, 224b is in the closed configuration, the closure 264 is configured to cover each of the lower sockets 244 formed in the distal end 238 of the sidewall 221, 222 such that the closure 264 captures a portion of one of the rollers 214 within the respective lower socket 244.

The closure 264 includes an arm 266 extending inwardly from the inner wing surface 258 to a distal end including a rib or tooth 268 that extends away from the arm 266 towards the lower end 254 of the wing 224a, 224b. Accordingly, the inner wing surface 258, the arm 266, and the tooth 268 cooperate to define a recess 270 having an opening facing the lower end 254 of the wing 224a, 224b. In the illustrated example, the closure 264 includes a plurality of the teeth 268 arranged in series along a length of the wing 224a, 224b.

The longitudinal spacing of the teeth 268 corresponds to the spacing of the lower sockets 244 formed in the distal end 238 of the sidewall 221, 222 such that each tooth 268 is positioned between an adjacent pair of the lower sockets 244 and is configured to engage the neck 248 formed at the distal end 238. Accordingly, adjacent or subsequent ones of the teeth 268 may be separated from each other by an upper socket 273 configured to cooperate with the lower socket 244 when the wing is in the closed configuration to capture the shaft 215 of the roller 214 within the conveyor frame 212.

Each wing 224a, 224b may further include a plurality of spacers 272 and one or more longitudinal ribs 274 formed on the inner wing surface 258. The plurality of spacers 272 are arranged in series along the inner wing surface 258 between the first end 204 and the second end 206. Here, the longitudinal spacing of the spacers 272 is configured such that each spacer 272 contacts the outer sidewall surface 242 between adjacent ones of the lower sockets 244 when the wing 224a, 224b. The longitudinal ribs 274 include a pair of parallel longitudinal ribs 274 each extending along the direction from the first end 204 to the second end 206. A first one of the longitudinal ribs 274 is disposed adjacent to the lower end 254 of the wing 224a, 224b and a second one of the ribs 274 is positioned between the first longitudinal rib 274 and the upper end 256 of the wing 224a, 224b. The longitudinal ribs 274 and the spacers 272 may cooperate to maintain a desired alignment between the wings 224a, 224b and the corresponding sidewalls 221, 222 and to prevent overextension of the hinge 262 when the wings 224a, 224b are moved to the closed configuration.

As best shown in FIGS. 6 and 7, the outer wing surfaces 260 of the wings 224a, 224b include a plurality of side couplers 276a-276d generally configured for coupling adjacent ones of the conveyor units 202 together when assembled as part of the conveyor system 200. In FIG. 6, the outer wing surface 260 of the first wing 224a includes a first side coupler 276a adjacent to the first end 204 and a second side coupler 276b adjacent to the second end 206. In FIG. 7, the outer wing surface 260 of the second wing 224b includes a third side coupler 276c adjacent to the first end 204 and a fourth side coupler 276d adjacent to the second end 206.

In the illustrated example, each of the side couplers 276a-276d includes a pair of longitudinal ribs 278 that are spaced apart from each other by a distance $D_{276a}$-$D_{276d}$. The longitudinal ribs 278 of each side coupler 276a-276d are spaced apart in a manner that allows the first side coupler 276a of a first conveyor unit 202 to interface or mate with the second side coupler 276b of a second conveyor unit 202 when the conveyor units 202 are assembled side-by-side with alternating orientations (i.e., the first side 208 of the first conveyor unit 202 faces the first side 208 of the second conveyor unit 202 or vice versa). Likewise, the longitudinal ribs 278 of the third side coupler 276c are configured to mate or interface with the longitudinal ribs 278 of the fourth side coupler 276d when the conveyor units 202 are assembled.

Additionally, the side couplers 276a-276d are configure to prevent improper assembly (i.e., not alternating) of the conveyor units 202. For example, the distances $D_{276a}$-$D_{276d}$ between the longitudinal ribs 278 of the side couplers 276a-276d are configured such that the longitudinal ribs 278 of the first side coupler 276a and the second side coupler 276b will abut or interfere with the longitudinal ribs 278 of the third side coupler 276c and the fourth side coupler 276d if the conveyor units 202 are assembled in a non-alternating manner (i.e., first side 208 of first conveyor unit 202 facing the second side 210 of second conveyor unit 202). This unique spacing between the longitudinal ribs 278 of the various side couplers 276a-276d acts as a poka-yoke to ensure proper assembly (i.e., alternating) of the conveyor units 202.

With continued reference to FIGS. 2, 6, and 7, each conveyor unit 202 includes the first end coupler 216 disposed at the first end 204 and the second end coupler 218 disposed at the second end 206. Here, each end coupler 216, 218 is attached to a respective end of the conveyor frame 212. In some examples, the end couplers 216, 218 may be integrally formed with the conveyor frame 212. Each of the end couplers 216, 218 includes a coupler base 280a, 280b attached to the end of the conveyor frame 212 and a coupler rail 282 extending from the coupler base 280a, 280b in a direction away from the conveyor frame 212. As discussed below, the coupler rails 282 are generally configured to interface with the track members 102 when the shelving system 10 is assembled.

Referring to FIGS. 6 and 7, the coupler bases 280a, 280b each have a generally rectangular cross section extending from a proximal first side 284 attached to base 220 and the sidewalls 221, 222 of the conveyor frame 212, and a distal second side 286 formed on an opposite side from the first side 284. A distance between the first side 284 of the coupler base 280a, 280b and the second side 286 of the coupler base defines a length $L_{280a}$, $L_{280b}$ of the coupler base.

Each of the coupler rails 282 forms a first coupling element of a coupling system for securing the end 204, 206 of the conveyor unit 202 to the track member 102. Here, the coupler rail 282 includes a neck portion 288 having a proximal end attached to the second side 286 of the coupler base 280a, 280b and a head portion 290 attached to a distal end of the neck portion 288 and having a greater thickness $T_{290}$ than the neck portion 288. In the illustrated example, the coupling system is configured as a T-slot whereby each of the coupler rails 282 defines the male portion of the T-slot interface while the conveyor track 104 defines the corresponding female portion (i.e., the T-slot). However, the coupling system may be inverted such that the male portion of the interface is provided on the conveyor track 104 and the female portion of the interface is provided on the coupler rail 282.

Optionally, the coupler bases 280a, 280b may have different lengths $L_{280a}$, $L_{280b}$ such that the first end coupler 216 extends from the first end 204 of the conveyor frame 212 a different distance than the second end coupler 218. For example, the first coupler base 280a of the first end coupler 216 may have a shorter length $L_{280a}$ than the length $L_{280b}$ of the second coupler base 280b of the second end coupler 218. By providing the coupler bases 280a, 280b with different lengths $L_{280a}$, $L_{280b}$, the conveyor units 202 are offset along the longitudinal direction of the conveyor system 10 towards the first end 204. When the conveyor units 202 are installed in an alternating manner, this offset towards the first end 204 provides a corresponding offset in the alignments of the rollers 214 of adjacent ones of the conveyor units 202. Thus, the rollers 214 of a first one of the conveyor units 202 are offset towards the front side 12 while the rollers 214 of an adjacent second one of the conveyor units 202 are offset towards the rear side 14. Offsetting the rollers 214 of adjacent conveyor units 202 increases the overall support provided by the support bed 16 by increasing the number contact points along the length of the conveyor system 200. In other words, offsetting the rollers 214 provides twice as many contact points for supporting merchandise compared to having the rollers 214 of adjacent conveyor units 202 aligned with each other.

Figure 9:
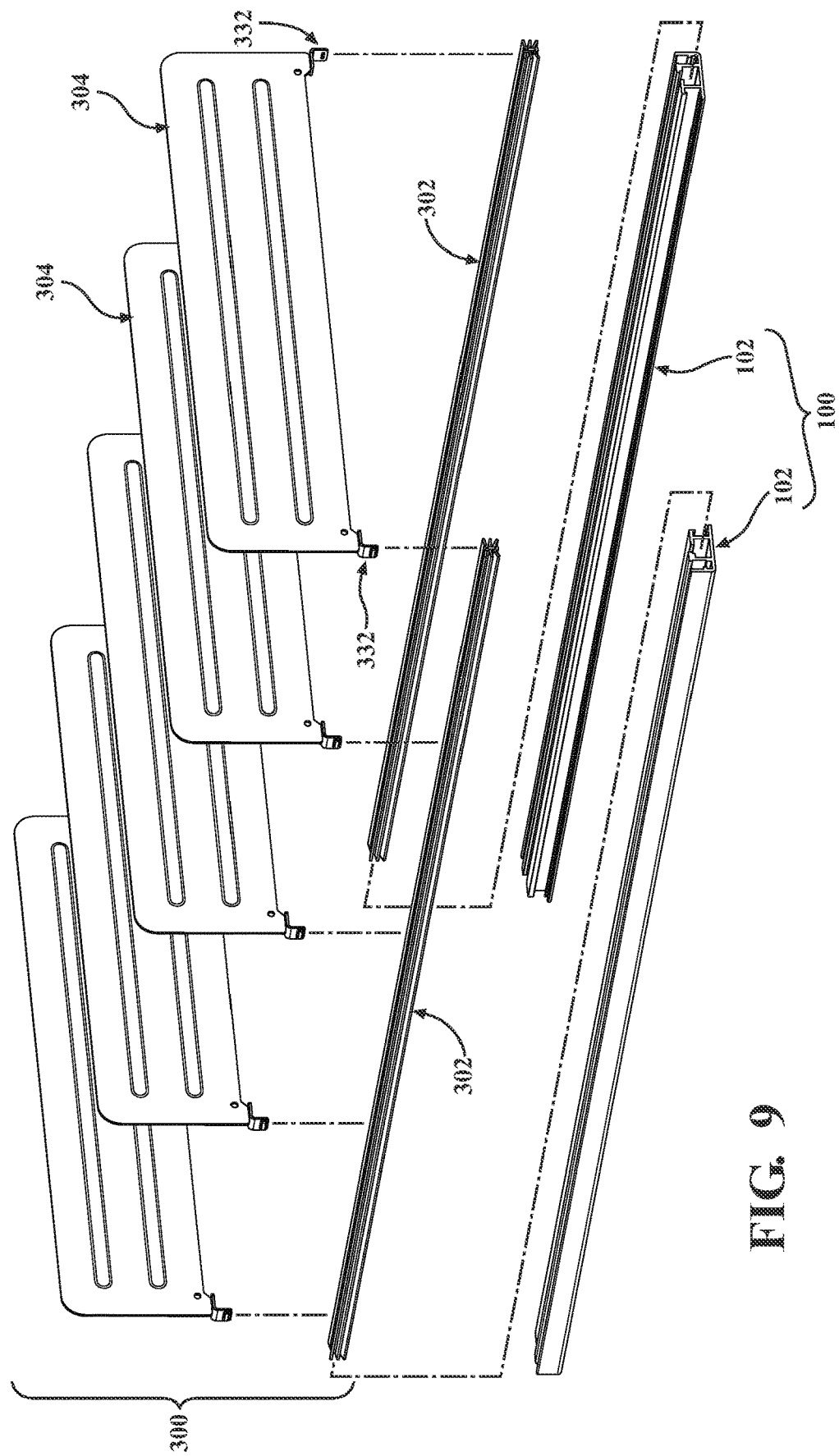
FIG. 9 is an exploded perspective view of the divider system and track system of FIG. 8.

Referring now to FIGS. 8-12, the divider system 300 includes a pair of divider track inserts 302 and one or more of the divider units 304. The track inserts 302 are each configured to be disposed in the divider track 106 of one of the track members 102. Generally, the divider system 300 is configured such that the divider units 304 can be selectively attached to each of the divider track inserts 302 by snapping the divider unit 304 into the divider track insert 302 from the top side 112 of the track member 102. As shown in FIG. 9, each of the divider track inserts 302 is configured to be inserted into the divider track 106 from an open end of one of the track members 102. As best shown in FIGS. 11A and 11B, the divider track insert 302 includes a receiver 310 configure to interface with one of the divider units 304 and a plurality of stabilizers 312a-312c extending outwardly from an outer surface of the receiver 310.

The receiver 310 of the divider track insert 302 is configured as a U-shaped body including an arcuate lower portion 314 and a pair of legs 316 extending from opposite sides of the lower portion 314. The legs 316 and the lower portion 314 cooperate to define a lower socket 318 having an opening 320 aligned with the opening defined by the neck portion 142 of the divider track 106. One or both of the legs 316 may include one or more protuberances 319 formed adjacent to a distal end of the leg 316 such that the opening 320 has a lesser width than a width of the lower socket 318.

In the illustrated example, each of the stabilizers 312a-312c extends outwardly from a proximal end 322 attached to an outer surface of the receiver 310 to a distal end 324 configured to interface with an inner surface of the divider track 106. Particularly, the stabilizers 312a-312c include a pair of lower stabilizers 312a extending from an intersection between the lower portion 314 and one of the legs 316 to a distal end 324 received in a corner formed by an intersection between the base member 120 and a respective one of the inner track wall 122 and the intermediate track wall 124. The stabilizers 312a-312c further include a pair of upper stabilizers 312b extending from the distal ends of the legs 316 to distal ends 324 received in corners formed between each of the track walls 122, 124 and the retainer 128, 130 of the respective track wall 122, 124. Thus, the lower stabilizers 312a and the upper stabilizers 312b are vertically and longitudinally captured at each corner of the head portion 140 of the divider track 106. Optionally, the stabilizers 312a-312c may include any number of intermediate stabilizers 312c extending outwardly from the receiver 310 between the lower stabilizers 312a and the upper stabilizers 312b such that the distal ends 324 contact one of the inner track wall 122 and the intermediate track wall 124 to further secure a position of the divider track insert 302 within the divider track 106.

In some configurations, the divider track insert 302 may be formed as a composite structure, whereby the receiver 310 includes a first material having a first stiffness and/or coefficient of friction and the stabilizers 312a-312c include a second material having a second stiffness and/or coefficient of friction that is different than the first material. For example, the receiver 310 may form a relatively rigid core having a first stiffness that is greater than a second stiffness of the stabilizers 312a-312c. In other words, the stabilizers 312a-312c may be more resilient than the core defined by the receiver 310 to allow the stabilizers 312a-312c to flex within the divider track 106. Additionally or alternatively, the second material of the stabilizers 312a-312c may have a greater coefficient of friction than the first material of the receiver 310 to provide a gripping interface between the divider track insert 302 and the interior surfaces of the divider track 106.

Optionally, the stabilizers 312a-312c may be integrally formed with an outer shell 326 that attaches to the outer surface of the receiver 310. The outer shell 326 and the stabilizers 312a-312c are integrally formed with each other and may be co-extruded or co-molded with the receiver 310.

Figure 12:
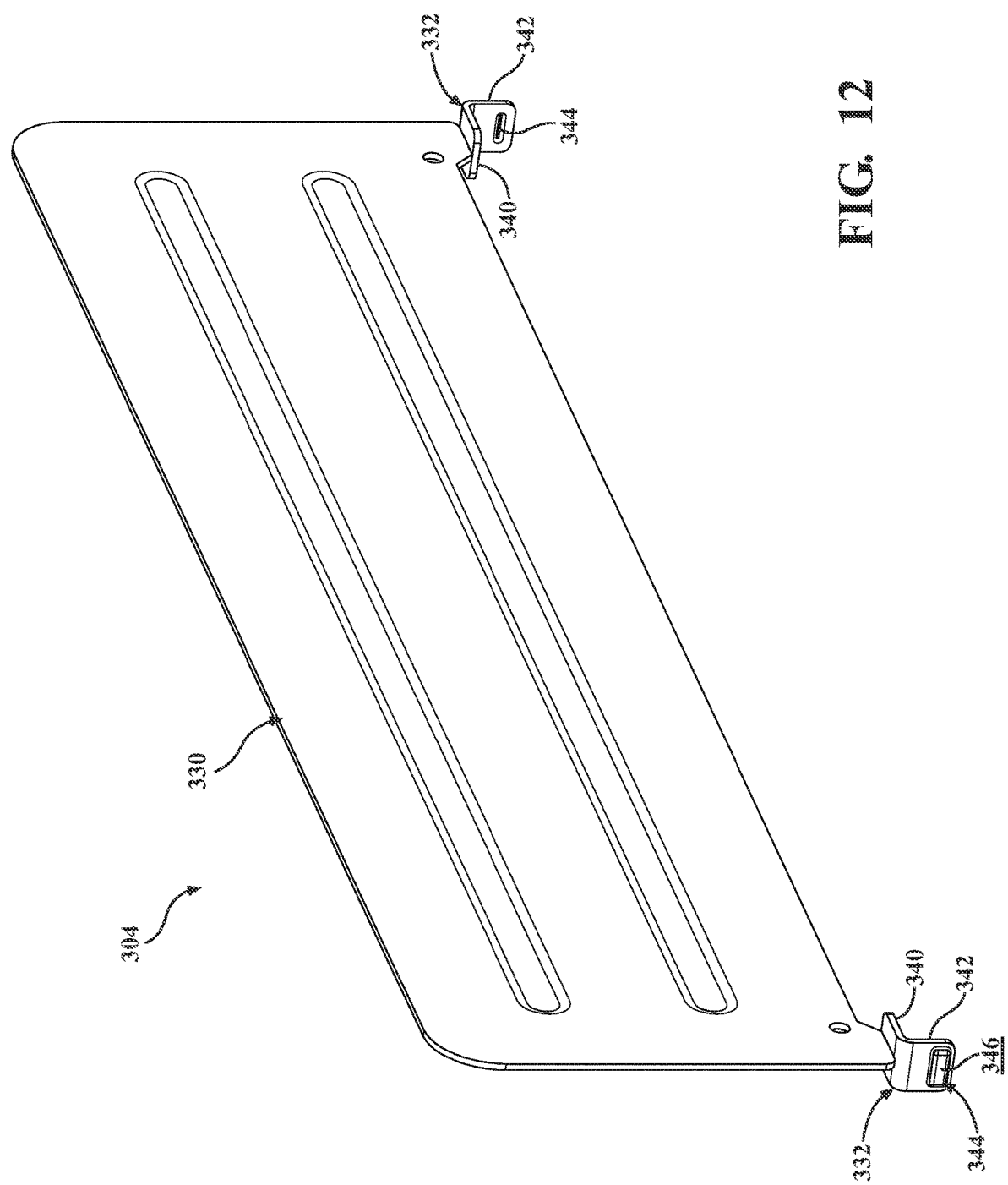
FIG. 12 is a perspective view of an example divider of the divider system of FIG. 8.

Referring to FIG. 12, each of the dividers 302 includes a divider wall 330 and a pair of divider coupling tabs 332 disposed at opposite ends of the divider wall 330. Each of the divider walls 330 has a length and a height configured to provide separation between adjacent bays 18 of the shelving system 10. Optionally, the divider wall 330 may include one or more reinforcing ribs 334 extending along a length of the divider wall 330. In the illustrated example, the reinforcing ribs 334 are formed as distended portions of the divider wall 330 having an arcuate cross section extending along the length of the divider wall 330. The divider wall 330 may further include a clearance notch 336 formed along the bottom side of the divider wall 330 and configured to provide a relief through which the rollers 214 can pass beneath the divider wall 330 as the divider wall is translated along the shelving system 10.

The divider coupling tabs 332 are attached to a bottom side of the divider wall 330 at opposite ends. Particularly, the divider coupling tabs 332 include a first leg 340 attached to the bottom side of the divider wall 330 and a second leg 342 extending from the first leg 340 in a direction away from the bottom side of the divider wall 330. Here, the first leg 340 may be described as being a "horizontal" leg configured rest atop the inner track wall retainer 128, while the second leg 342 may be described as a "vertical" leg configured to extend downwardly and engage the receiver 310. Thus, each of the first leg 340 and the second leg 342 may be configured with respect lengths and widths to provide a stable interface between the divider unit 304 and the track system 100. The second leg 342 of the divider coupling tab 332 includes a projection 344 disposed adjacent to a lower, distal end of the second leg 342. In the illustrated example, the projection 344 includes a distended portion of the second leg 340 that provides a lower portion of the second leg 342 with a thickness $T_{342}$ that is greater than the width of the opening 320 of the lower socket 318. Thus, to insert the divider coupling tab 332 into the receiver 310, the distal end of the second leg 340 must be "snapped" into the lower socket 318 by biasing the projection 344 between the protuberances 319 of the receiver 310.

A depth $D_{344}$ of the projection 344 extends from a front surface the second leg 342 to a distal end surface 346 of the projection 344. Optionally, the depth $D_{344}$ of the projection may be greater than a distance from the front surface of the second leg 342 to an opposing interior surface of the lower socket 318 when the lower leg 340 is fully seated within the receiver 310. Accordingly, as shown in FIG. 11A, a distal end surface 346 of the projection 344 may contact the interior surface of the lower socket 318 to provide a frictional interface between the second leg 342 and the receiver 310. This frictional interface is configured to define a threshold lateral force that must be applied to the divider unit 304 to facilitate lateral movement thereof. Thus, the projection 344 may be dimensionally tuned (i.e., greater height, width, depth) or provided with frictional properties (e.g., high-friction materials) to define the desired adjustment threshold. For example, a greater adjustment threshold may be provided by increasing the friction between the projection 344 and the lower socket 318 where it is desired to make it more difficult to translate the divider unit 304 along the divider track 106. Different adjustment thresholds may be utilized for different product types (e.g., heavy products use dividers with greater adjustment threshold).

By utilizing the continuous frictional interface provided by the receiver 310 and the divider coupling tabs 332, the divider units 304 can be easily installed onto the shelving system 10 by snapping each of the divider coupling tabs 332 into a respective one of the divider tracks 106. The continuous lower sockets 318 accommodate lateral misalignment of the divider coupling tabs 332 of the divider unit 304 by allowing the divider coupling tabs 332 at each end of the divider unit 304 to be snapped into the receiver 310 and then translated after installation to align the ends of the divider unit 304. In contrast, conventional dividers utilize a locking means to prevent lateral movement or misalignment, which requires perfect lateral alignment to allow assembly of the system. This is particularly challenging in a store environment, where a user may not have clear access or visibility to the rear portion of the shelf.

With particular reference to FIGS. 13-21, another example of a shelving system 10a is provided. In view of the substantial similarity in structure and function of the components associated with the shelving system 10 with respect to the shelving system 10a, like reference numerals are used hereinafter and in the drawings to identify like components while like reference numerals containing letter extensions are used to identify those components that have been modified.

Figure 13:
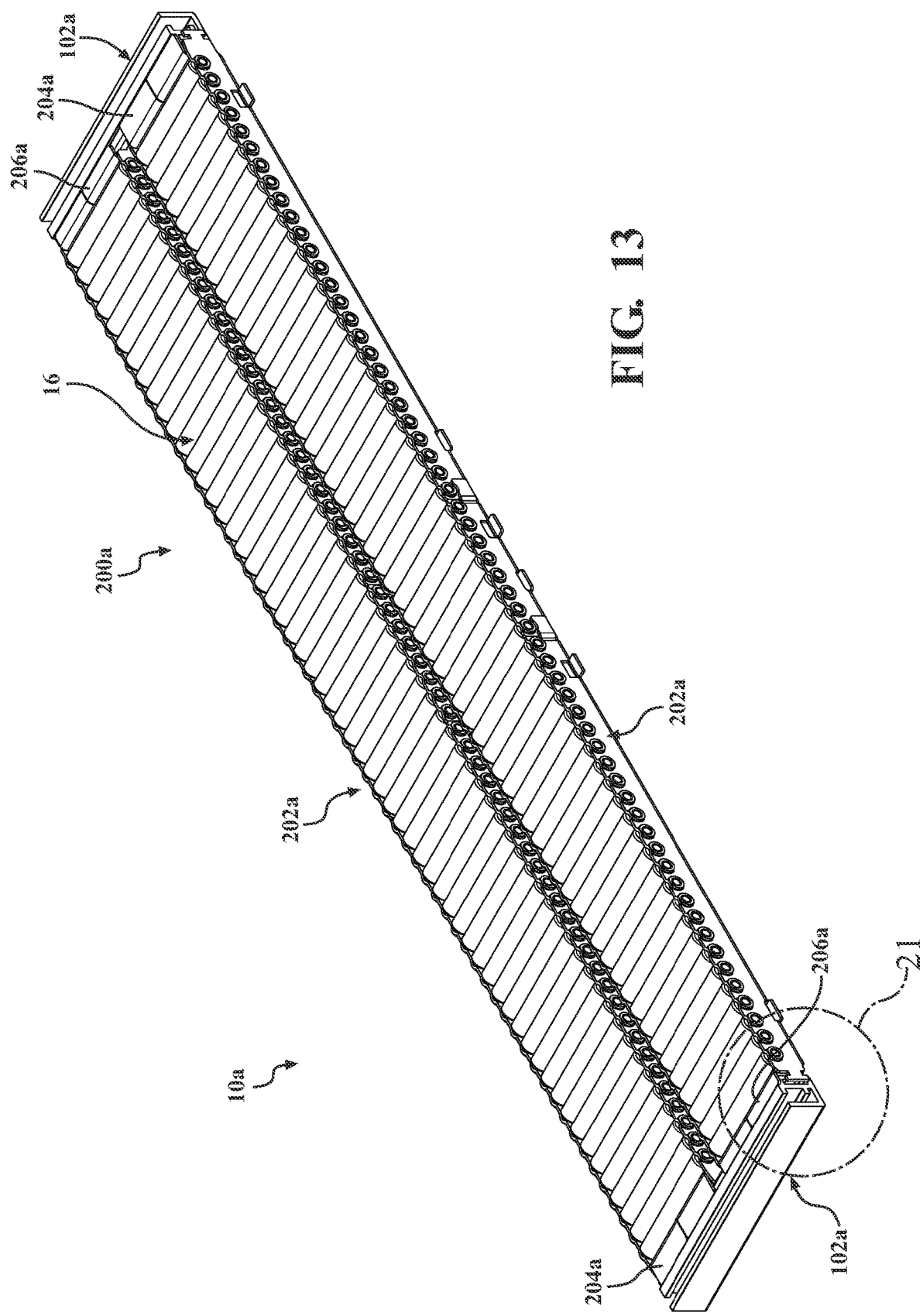
FIG. 13 is a perspective view of another example of a shelving system according to the principles of the present disclosure.

Referring to FIG. 13, a track system 100a and a conveyor system 200a according to another example of the disclosure are provided. As used previously, shelving system 10a and components thereof may be described with reference to a front side 12 corresponding to a product dispensing location that may face a store aisle and a rear side 14 formed on the opposite side of the shelving system 10a from the front side 12. Furthermore, the shelving system 10a and components thereof may be described relative to a longitudinal direction or axis extending from the front side 12 to the rear side 14 or a lateral direction or axis extending perpendicular to the longitudinal direction.

The shelving system 10a may be provided as a standalone unit for use in a retail environment, or may be provided in combination with a plurality of the shelving systems 10a. Furthermore, the shelving system 10a may be configured for direct attachment to one or more shelving support members (not shown), such as uprights or walls, or alternatively, may be installed on existing shelves. Optionally, the shelving system 10a may be provided as a gravity-fed shelving system 10a, whereby the shelving system 10a is oriented at an oblique angle relative to level such that a support bed 16 of the shelving system forms a decline from the rear side 14 of the shelving system 10a to the front side 12 of the shelving system 10a.

Figure 21:
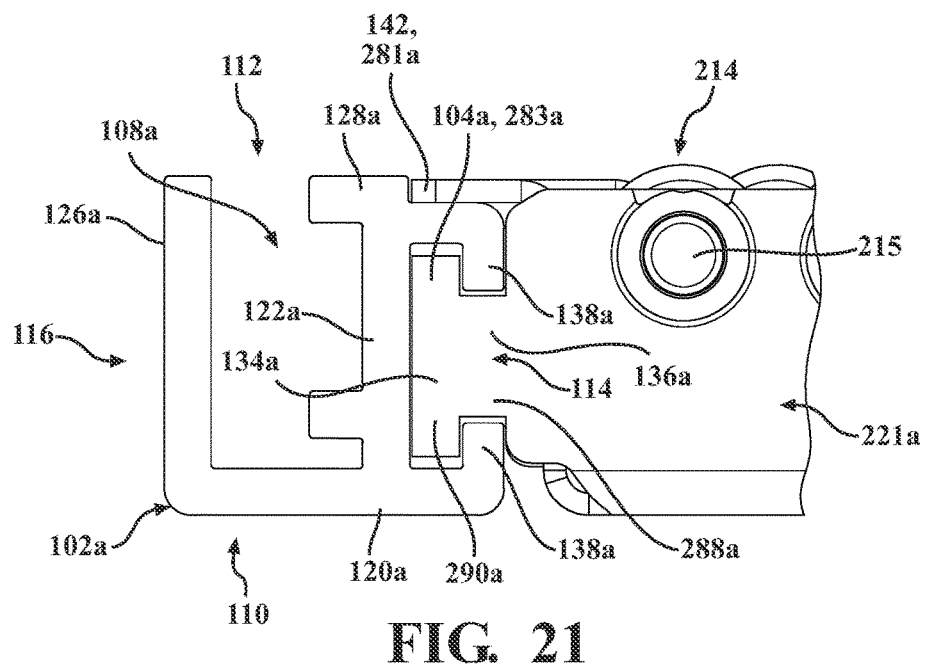
FIG. 21 is an enlarged view of a first end of the conveyor, taken at Area 21 of FIG. 13.
Figure 22:
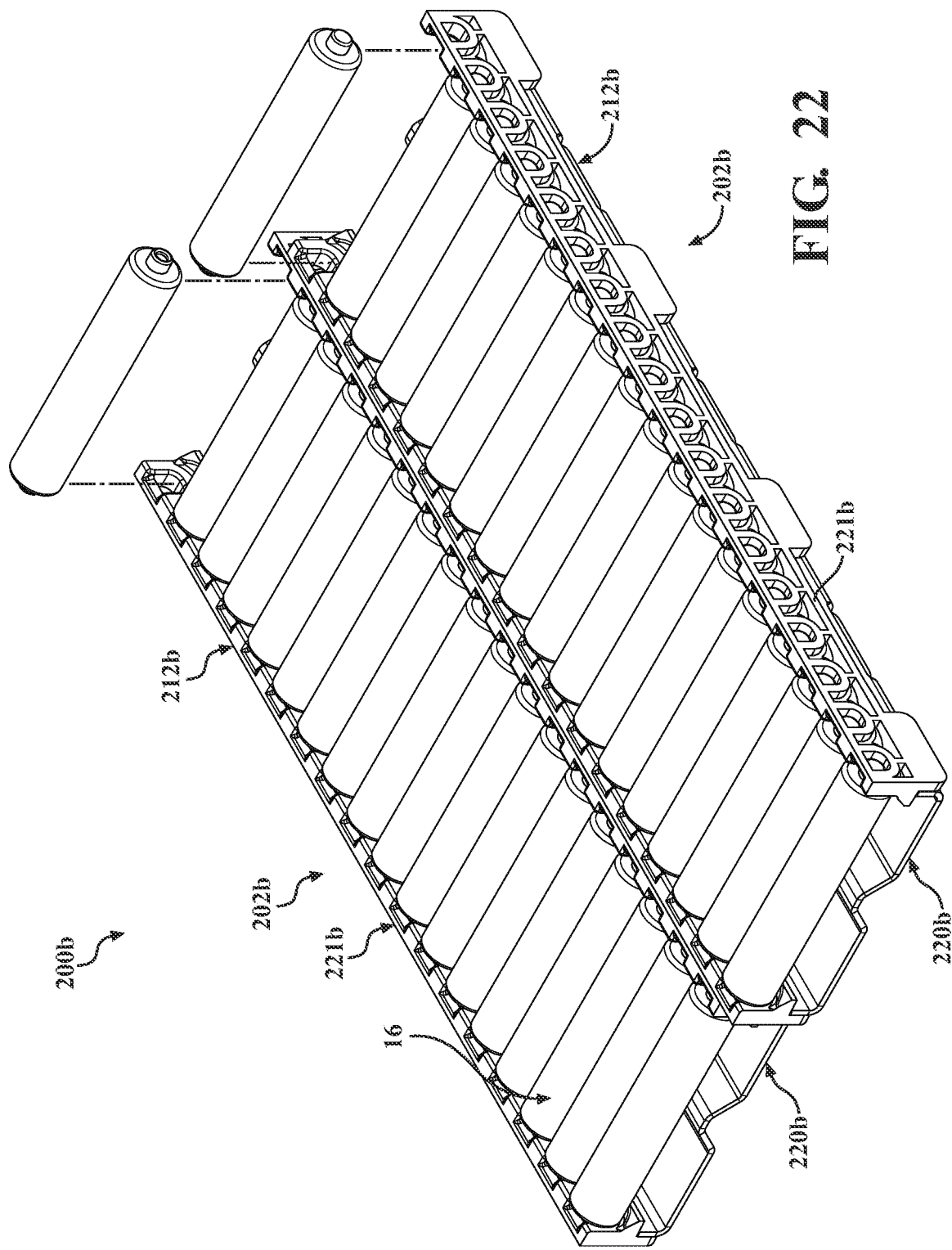
FIG. 22 is a perspective view of another example of a shelving system according to the principles of the present disclosure.

Generally, the track system 100a includes a pair of track members 102a each defining one or more of a conveyor track 104a and an accessory track 108a (FIG. 21). The conveyor system 200a of the shelving system 10a includes one or more conveyor units 202a collectively defining the support bed 16 of the shelving system 10. In the illustrated example, the conveyor system 200a includes a plurality of the conveyor units 202a attached to the track system 100a such that the conveyor units 202a cooperate to define the support bed 16 of the shelving system 10. With reference to FIG. 13, the shelving system 10a includes the track system 100a generally configured to facilitate attachment and lateral translation of the various components of the conveyor system 200a and various accessories. Here, the track system 100a includes a pair of the track members 102a, with a first track member 102a extending along the front side 12 and a second track member 102a extending along the rear side 14. While the track members 102a of the present disclosure are shown as being identical, in some examples one of the track members 102a may be different. For example, one of the track members 102a may be provided without the accessory track 108a. Alternatively, the shelving system 10a may utilize a track system including a divider track, similar to the track system 100 provided above.

Referring to FIG. 21, each track member 102a includes the conveyor track 104a and the accessory track 108a. For the sake of description, each track member 102a and elements thereof may be described relative to a bottom side 110, a top side 112, an inner side 114 configured to face inward (i.e., towards the opposite track member 102a) and an outer side 116 configured to face outward (i.e., away from the opposite track member 102a). While the track members 102a illustrated in the figures are provided as integral units including both of the tracks 104a, 108a formed of a single piece, one or more of the tracks 104a, 108a may be provided as a detachable element. Furthermore, the track member 102a may be formed with any one of or any combination of the tracks 104a, 108a. For example, the track member 102a may be provided with just the conveyor track 104a or just the accessory track 108.

The track member 102a includes a base member 120a disposed along the bottom side 110 and a plurality of track walls 122a, 126a extending from the top side of the base member 120. The track walls 122a, 126a cooperate with each other to define the respective conveyor track 104a and accessory track 108a. For example, the track walls 122a, 126a include an inner track wall 122a extending from the base member 120a adjacent to the inner side 114 of the track member 102a and partly defining the conveyor track 104a and an outer track wall 126a extending from the base member 120a at the outer side 116 and cooperating with the inner track wall 122a to define the accessory track 108a. One or both of the track walls 122a, 126a may include a respective end cap or retainer 128a formed at the distal end of the track wall 122a, 126a and configured to partially define the geometry of one of the respective tracks 104a, 108a.

The conveyor track 104a of the track member 102a is formed as a T-slot configured to receive a corresponding T-shaped coupler element 283a, 283b of the conveyor system 200a along the inner side 114 of the track member 102a. Here, the T-slot includes a head portion 134a having a first height and a narrowed neck portion 136a having a second height that is less than the first height of the head portion 134a. The neck portion 136a defines an opening of the T-slot and faces toward the inner side 114 of the track member 102a. Here, the neck portion 136a is defined between an opposing pair of ribs 138a including a first rib 138a extending upwardly from the top side of the base member 120a and a second rib 138a extending downwardly from a distal end of an inner track wall retainer 128a formed at the distal end of the inner track wall 122a.

The accessory track 108a is formed adjacent to the outer side 116 of the track member 102a and is defined by the base member 120a, the inner track wall 122a, the outer track wall 126a, and the retainer 128a formed on the inner track wall 122a. The accessory track 108a is optional and may be configured to accept various shelving accessories, such as label holders, security devices, product displays, or the like. In the illustrated example, the accessory track 108a includes an opening formed along the top side 112 of the track member 102a. The accessory track 108a may include one or more ribs or other features configured to interface with corresponding features of an accessory (e.g., a label holder) and to allow the accessory to translate along the lateral direction within the accessory track 108.

Figure 15:
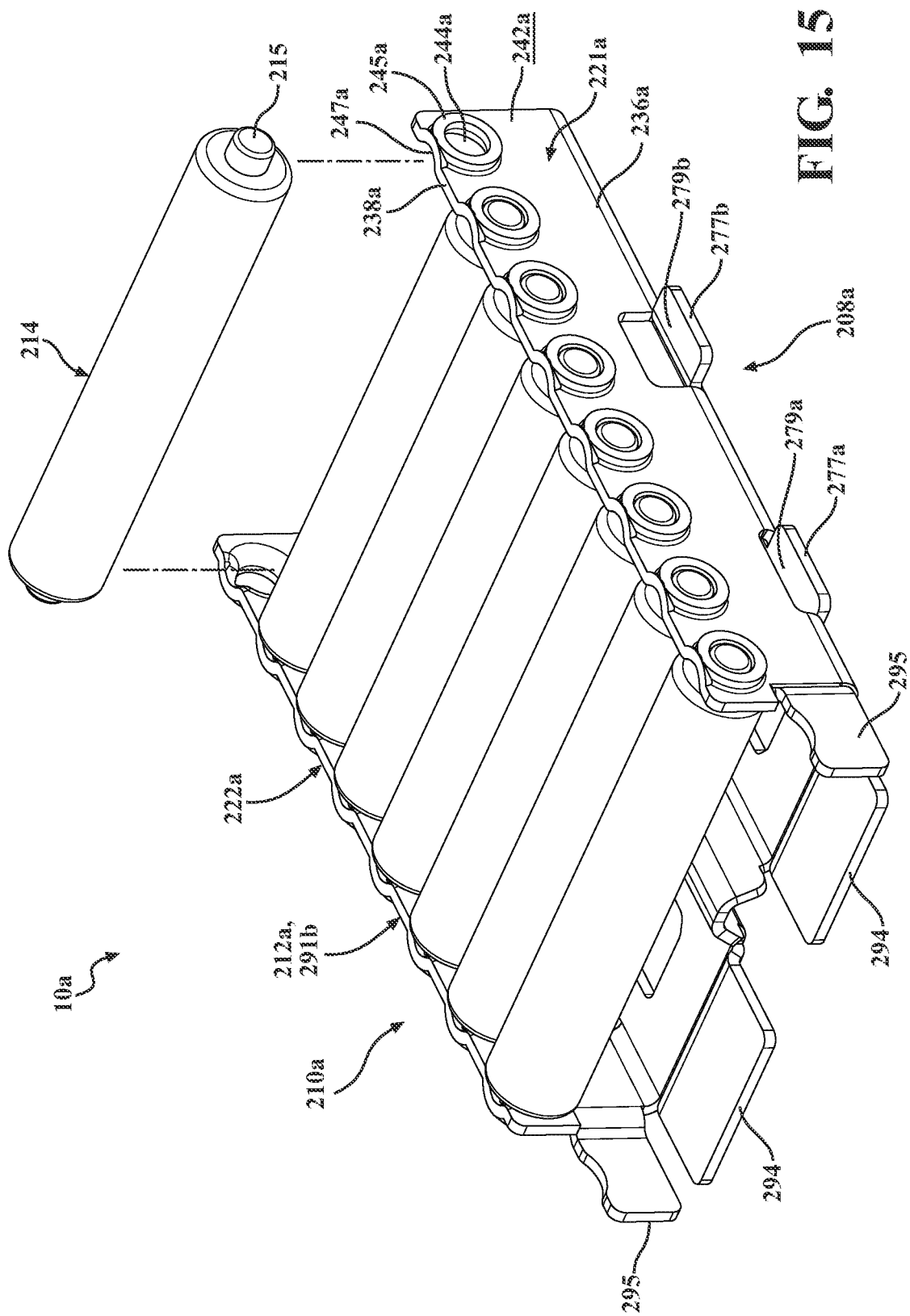
FIG. 15 is a fragmentary perspective view of a conveyor unit of the shelving system of FIG. 13, showing an intermediate frame segment of the conveyor unit.

Referring again to FIG. 13, an example of the conveyor system 200a is provided. As shown, the conveyor system 200a includes a pair of conveyor units 202a attached to the track system 100a. However, any width of track system 100a may utilized to include any number of conveyor units 202a. Each conveyor unit 202a may be described as having a longitudinal axis extending from a first end 204a to a second end 206a. Thus, a length of each conveyor unit 202a is defined by a distance from the first end 204a to the second end 206a. Additionally, as indicated in FIG. 15, each conveyor unit 202a includes a first side 208a extending between the first end 204a and the second end 206a and a second side 210a formed on an opposite side from the first side 208 and extending between the first end 204a and the second end 206a. A width of each conveyor unit 202a is defined by the distance across the conveyor unit 202a from the first side 208a to the second side 210a.

The conveyor unit 202a includes a conveyor frame 212a extending along the lengthwise direction of the conveyor unit 202a and a plurality of the rollers 214 attached to the conveyor frame 212a. Generally, the plurality of rollers 214 are arranged in series between the first end 204a and the second end 206a of the conveyor unit 202a such that rotational axes of the rollers 214 are parallel to each other and extend between the first side 208a and the second side 210a, thereby defining a continuous support bed 16.

Figure 14:
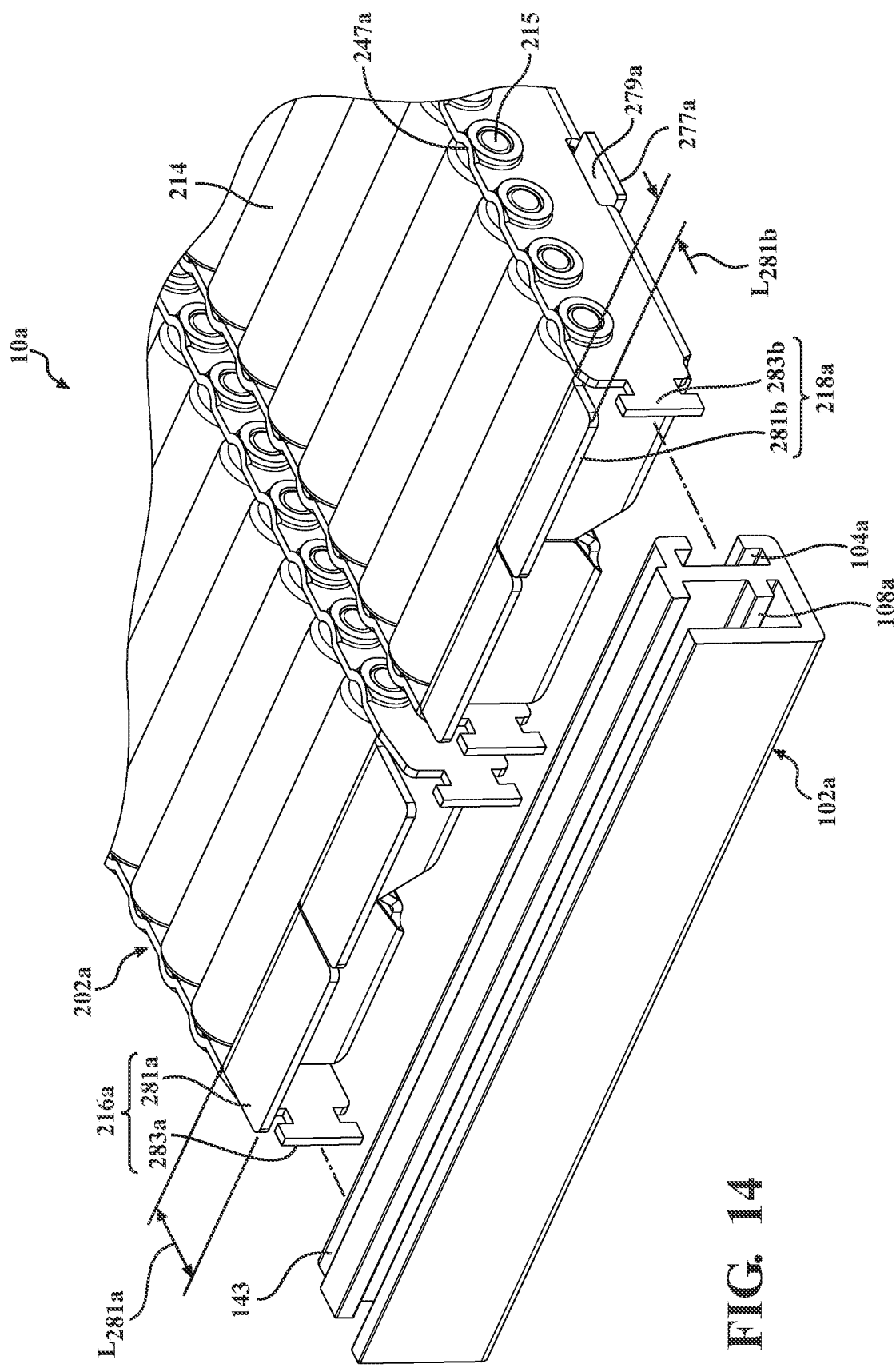
FIG. 14 is an enlarged, partial, exploded view of the shelving system of FIG. 13.

As shown in FIG. 14, the conveyor units 202a further include a first end coupler 216a disposed at the first end 204a of the conveyor frame 212a and a second end coupler 218a disposed at the second end 206a of the conveyor frame 212a. As discussed in greater detail below and illustrated in FIG. 14, the first end coupler 216a and the second end coupler 218a extend different lengths from the ends 204a, 206a of the conveyor frame 212a such that the conveyor frame 212a is offset (i.e., not centered) towards the first end 204a of the conveyor unit 202a.

Figure 16:
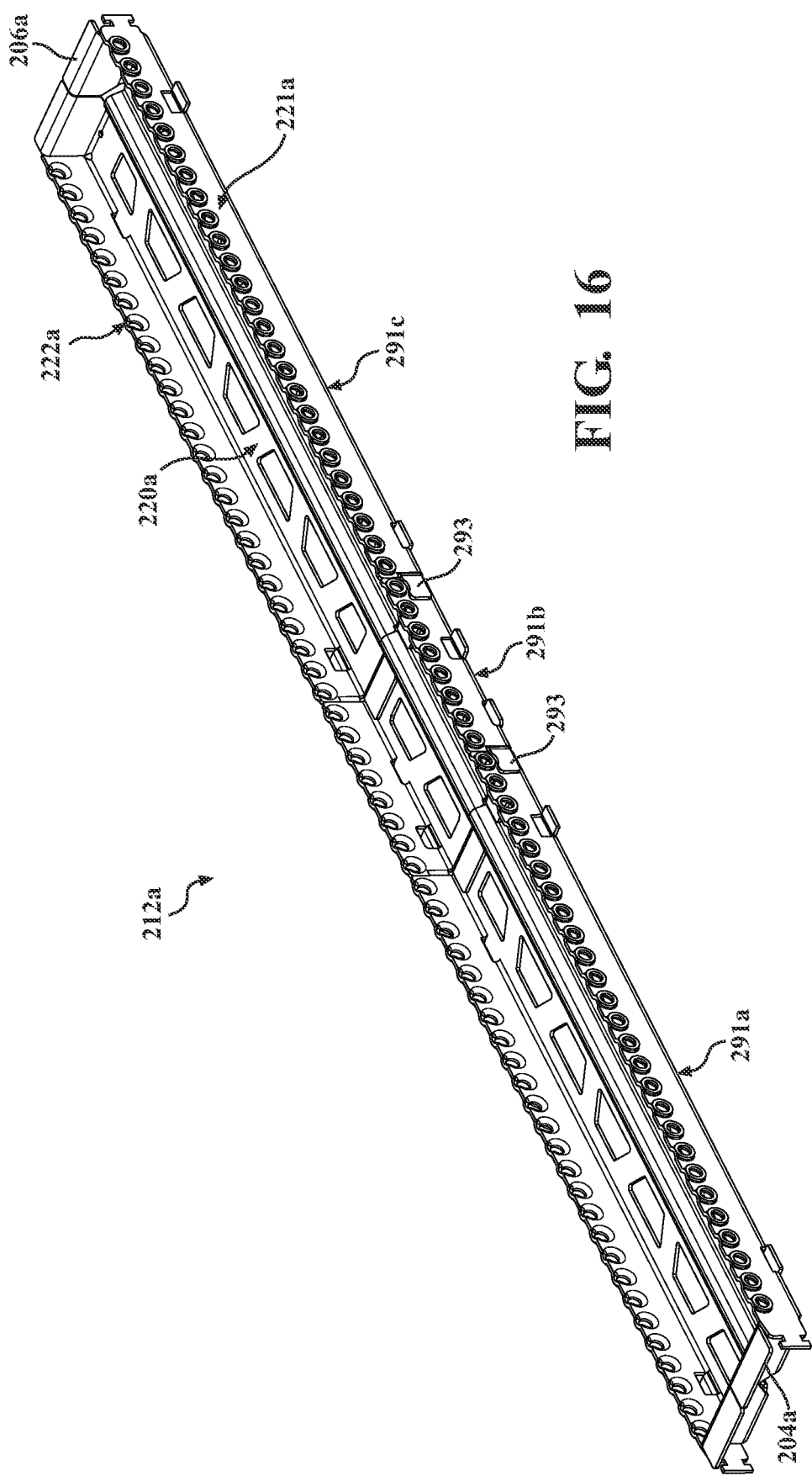
FIG. 16 is a perspective view of a conveyor frame of the shelving system of FIG. 13.
Figure 17:
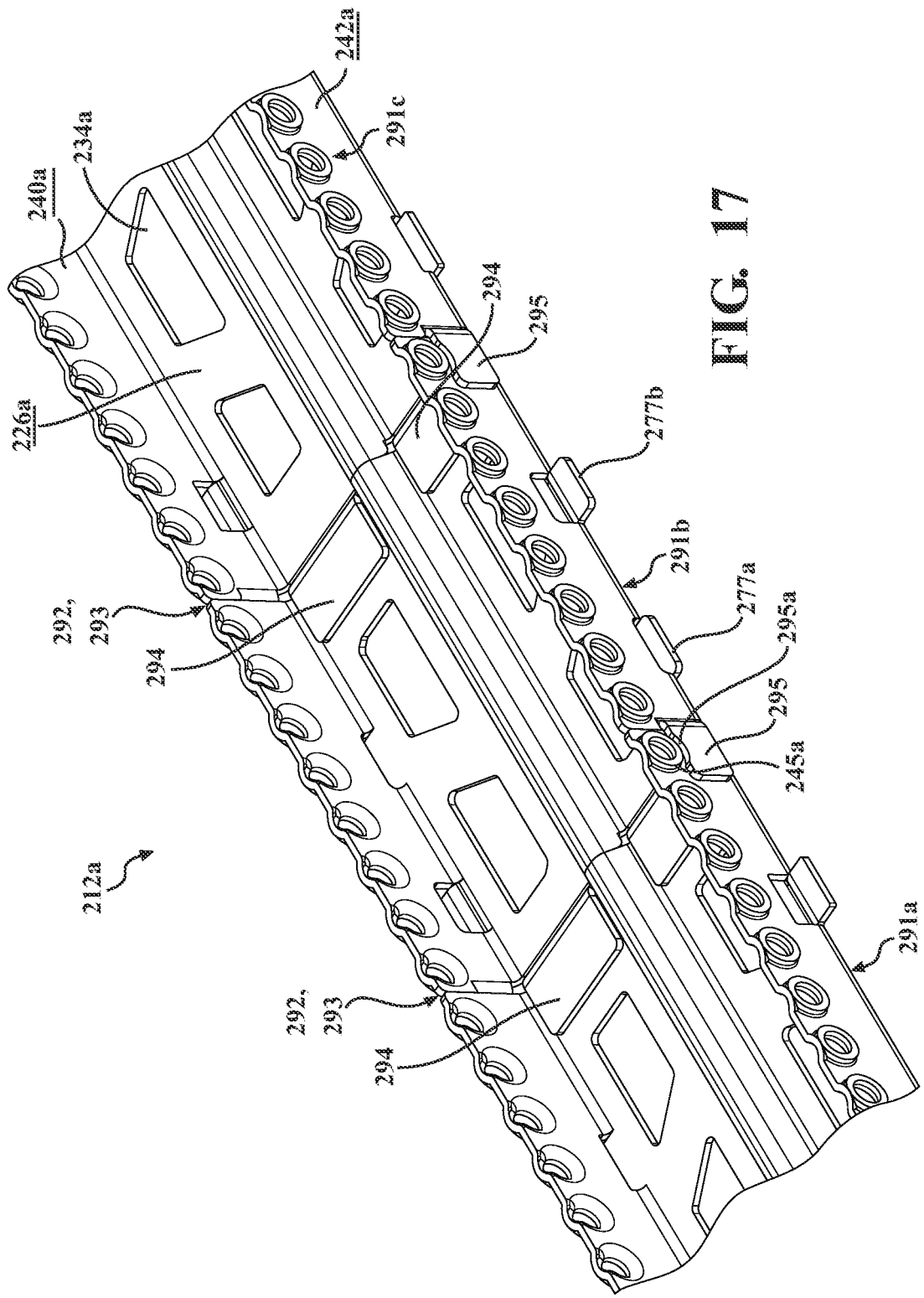
FIG. 17 is a partial perspective view of the conveyor frame of FIG. 16.
Figure 18:
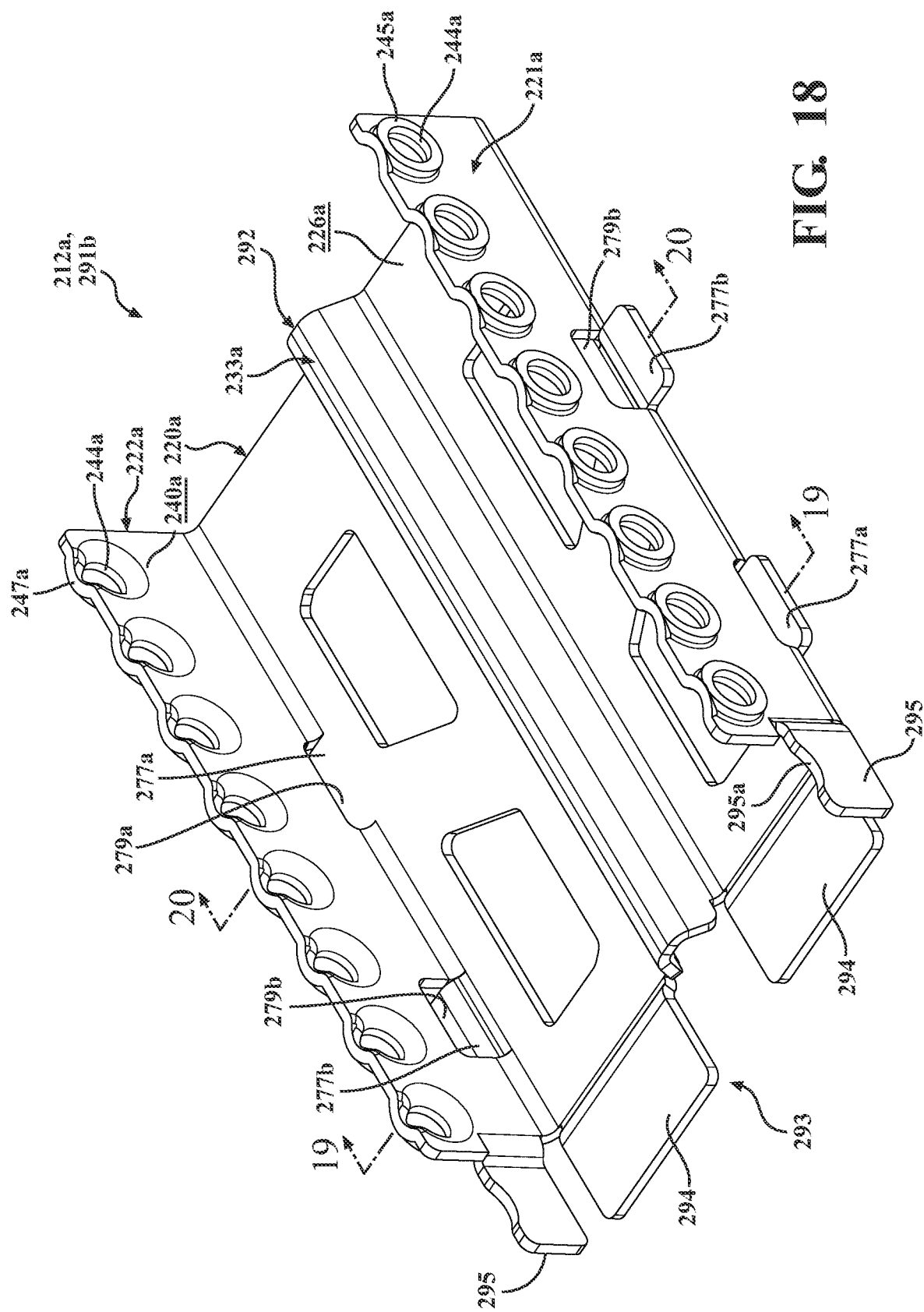
FIG. 18 is a perspective view of an intermediate frame segment of the conveyor frame of FIG. 16.

Referring to FIGS. 16-18 the conveyor frame 212a includes a base 220a, a first frame sidewall 221a extending from a first side of the base 220, and a second frame sidewall 222a extending from a second side of the base 220a on an opposite side of the conveyor frame 212a than the first frame sidewall 221a. The base 220a and each of the frame sidewalls 221a, 222a extend continuously along a length of the conveyor unit 202a from the first end 204a to the second end 206a.

Figure 19:
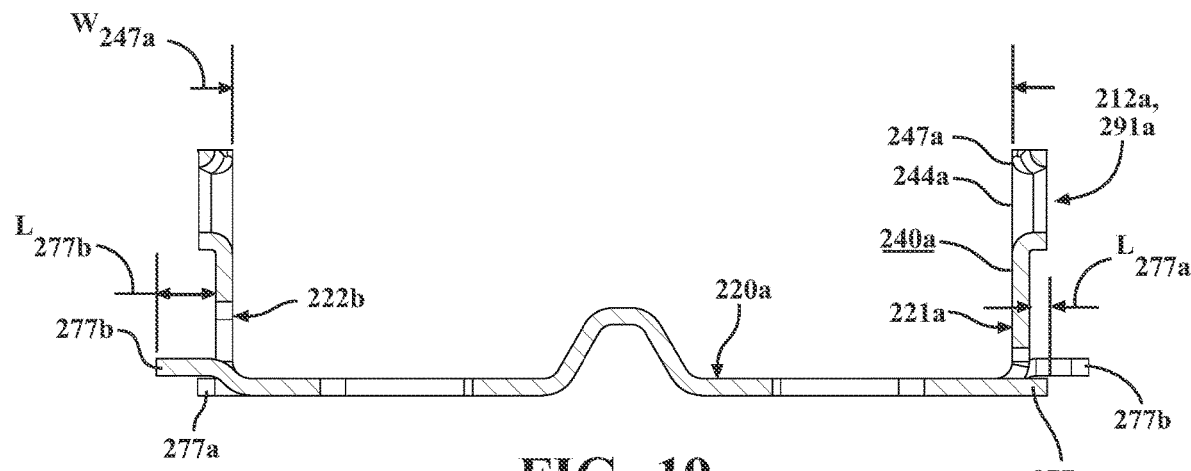
FIG. 19 is a cross-sectional view of the intermediate frame segment of FIG. 18, taken at Line 19-19 of FIG. 18.

Referring to FIGS. 18 and 19, the base 220a includes a top side 226a and a bottom side 228a formed on an opposite side of the base 220a from the top side 226a. Optionally, the base includes a central rib 233a that extends continuously from the first end 204a to the second end 206a. In some examples, the base 220a including the central rib 233a includes a constant thickness $T_{220a}$ measured from the top side 226a to the bottom side 228a. Thus, the central rib 233a is defined by a portion of the base 220a that protrudes from the top side 226a and defines an elongate channel along the bottom side 228a from the first end 204a to the second end 206a. The base 220a may further include a plurality of openings 234a formed through a thickness of the base 220a on either side of the central rib 233a. When included, the openings 234a may be arranged in series along the length of the conveyor frame 212.

Each of the frame sidewalls 221a, 222a extends from a proximal or lower end 236a attached to the base 220a to an upper or distal end 238a extending away from the base 220a. In other words, each frame sidewall 221a, 222a has a height extending from the top side 226a of the base 220a to the distal end 238a. Generally, the distal end 238a of each frame sidewall 221a, 222a is configured to receive and secure the rollers 214. Each frame sidewall 221a, 222a may be further described has having a width or thickness extending from an inner sidewall surface 240a (i.e., facing the other frame sidewall 221a, 222a) and an outer sidewall surface 242a formed on an opposite side from the inner sidewall surface 240.

Figure 20A:
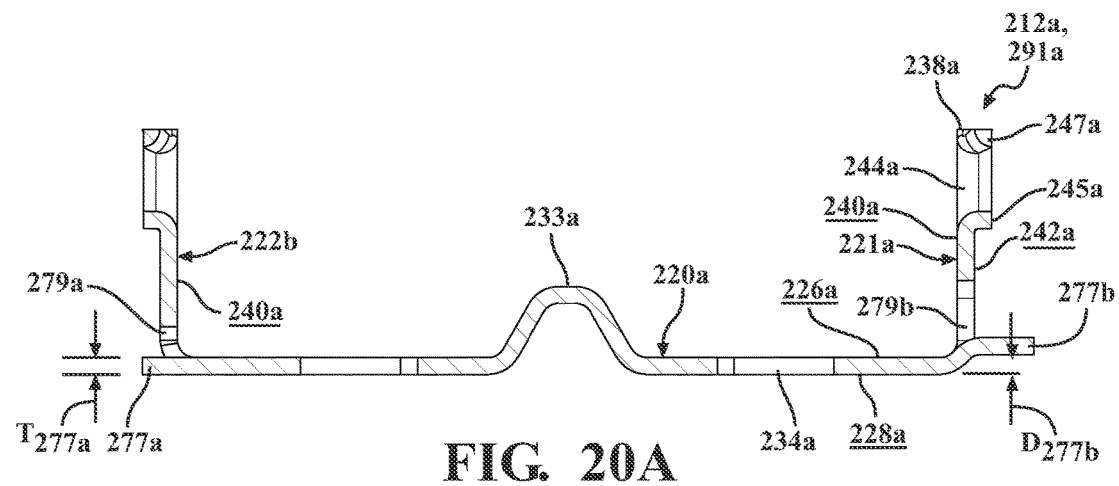
FIG. 20A is cross-sectional view of the intermediate frame segment of FIG. 18, taken at Line 20-20 of FIG. 18.
Figure 20B:
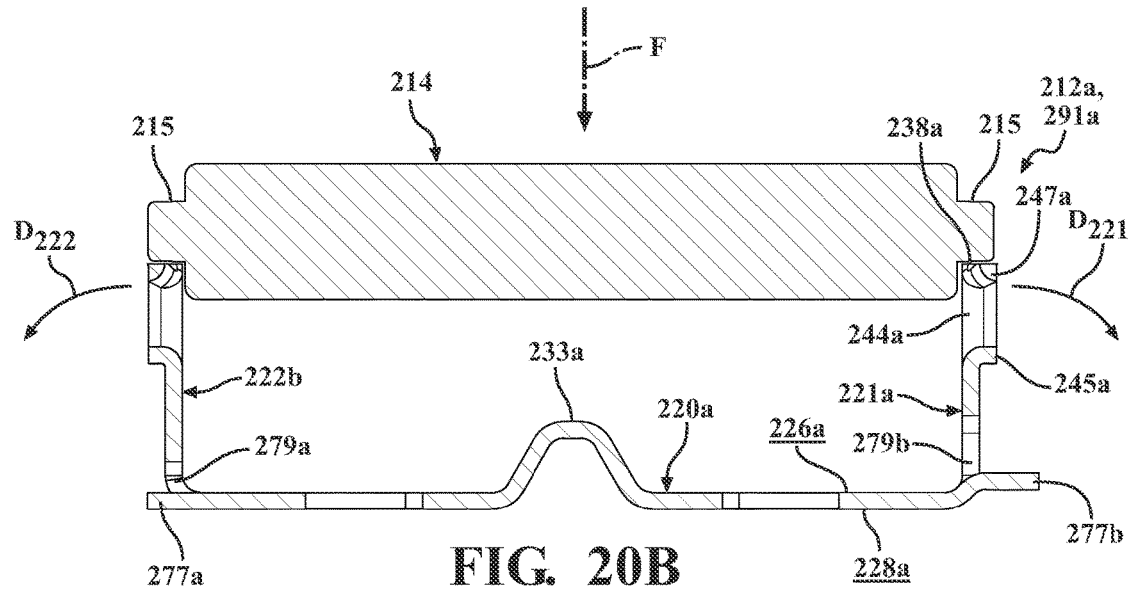
FIGS. 20B and 20C are cross-sectional views taken along Line 20-20 of FIG. 18, showing steps for installing a roller into the intermediate frame segment of FIG. 18.
Figure 20C:
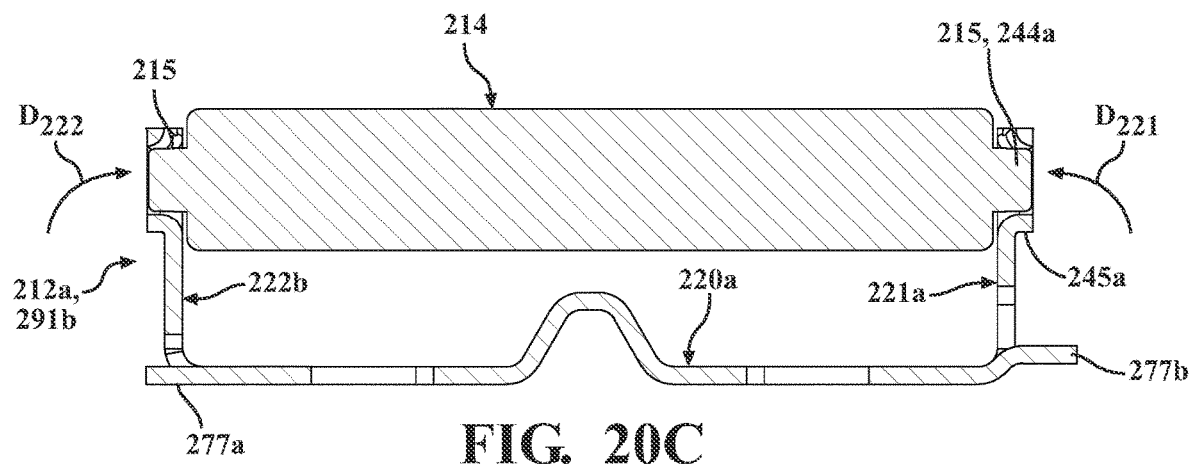

Referring to FIG. 15, the distal end 238a of each frame sidewall 221a, 222a includes a plurality of sockets 244a arranged in series from the first end 204a to the second end 206a of the conveyor unit 202a. Each of the sockets 244a is generally configured to receive a shaft 215 or axle of one of the rollers 214 when the rollers 214 are installed in the conveyor frame 212a (FIGS. 15 and 20C). In the illustrated example, each of the sockets 244a defines cylindrical aperture extending through the thickness of the frame sidewall 221a, 222a (i.e., from the inner sidewall surface 240a to the outer sidewall surface 242a) adjacent to the distal end 238a of the frame sidewall 221a, 222a. In the illustrated example, each the sockets 244a are evenly spaced along the length of each frame sidewall 221a, 222a and the spacing is selected to provide a desired spacing between adjacent ones of the rollers 214. Optionally, each of the sockets 244a may include a socket bearing 245a formed on the frame sidewall 221a, 222a. Generally, the socket bearing 245a is configured to provide additional bearing surface for supporting a roller shaft 215. The socket bearing 245a is configured to support the roller shaft 215 for rotation within the socket 244a. As shown, the sockets bearings 245a are defined by annular rims surrounding each socket 244a on the outer sidewall surface 242a. Thus, the socket bearings 245a may correspond to a portion of the sidewall 211a, 222b that protrudes or has an increased thickness. As discussed below, the socket bearings 245a may be integrally formed with the frame sidewalls 221a, 222a during a stamping process, whereby the socket bearings 245a and the sidewalls 221a, 222a include the same materials.

As best shown in FIGS. 14, 15, and 19-20C, the distal end 238a of each frame sidewall 221a, 222a includes a plurality of lip elements 247a each enclosing an upper portion of a respective one of the sockets 244a. The lip elements 247a are generally configured to guide the rollers 214 into the sockets 244a. As best shown in FIG. 18, each of the lip elements 247a defines a recess along the inner sidewall surface 240a at the distal end 238a, which is configured to interface with an axle 215 of the roller 214 when each roller 214 is initially engaged with the sidewall 221a, 222a. While the illustrated example provides an arcuate lip element 247a defining a concave recess relative to the inner sidewall surface 240a, other geometries may be utilized to accommodate particular roller shaft 215 shapes. Thus, the lip element 247a is configured to accommodate passage of the roller shaft 215 between the frame sidewalls 221a, 222a and into the corresponding sockets 244a on each frame sidewall 221a, 222b. In some examples, a width $W_{247a}$ (FIG. 19) between opposing lip elements 247a (i.e., laterally aligned across the conveyor frame 212a) may be less than an overall length of the roller shafts 215, whereby the rollers 214 must be press fit between the lip elements 247a and into the sockets 244a.

As best shown in FIGS. 17-20B, the conveyor frame 212a includes a plurality of side couplers 277a, 277b generally configured for coupling adjacent ones of the conveyor units 202a together when assembled as part of the conveyor system 200a. In FIG. 18, an intermediate segment of the conveyor frame 212a is illustrated and includes a first side coupler 277a and a second side coupler 277b spaced longitudinally from the first side coupler 277a along each of the frame sidewalls 221a, 222a. Generally, the first side coupler 277a of a first conveyor unit 202a is configured to interface or mate with a second side coupler 277b of an adjacent second conveyor unit 202a when the conveyor system 200a is assembled. This interfacing relationship between the side couplers 277a, 277b maintains longitudinal alignment between adjacent ones of the conveyor units 202a.

With reference to FIGS. 18 and 19, an opposing pair of the side couplers 277a, 277b is shown. Each of the side couplers 277a, 277b is formed adjacent to an intersection of the base 220a and one of the frame sidewalls 221a, 222b. Particularly, the side couplers 277a, 277b may be formed during a stamping process, whereby material of each frame sidewall 221a, 222b is formed into each of the respective side couplers 277a, 277b. For example, each of the side couplers 277a, 277b may define a tab 277a, 277b that is cut from the material of the sidewall 221a, 222b, whereby when the frame sidewall 221a, 222b is folded upwardly relative to the base 220a, the material defining each tab 277a, 277b remains substantially flat (i.e., parallel to the base 220a) and a corresponding cut-out or aperture 279a, 279b is formed in the frame sidewall 221a, 222a.

With continued reference to FIG. 19, the first side coupler 277a extends a first length $L_{277a}$ from the first frame sidewall 221a and is substantially flush with top side 226a of the base 220a of the conveyor frame 212a. Conversely, the second side coupler 277b extends a second length $L_{277b}$ from the second sidewall 222a that is greater than the first length $L_{277a}$ of the first side coupler 277a. As shown, the second side coupler 277b is vertically offset from the base 220a, whereby a lower surface of the second side coupler 277b is vertically offset from the bottom side 228a of the base 220a by a distance $D_{227b}$ corresponding to a thickness $T_{227a}$ of the first side coupler 277a. Accordingly, when adjacent conveyor units 202a assembled, the second side coupler 277b of one of the conveyor units 202a overlaps the first side coupler 277a of an adjacent conveyor unit 202a, whereby a distal end of the second side coupler 277b at least partially extends into the aperture 279a associated with the first side coupler 277a.

In addition to maintaining alignment, the side couplers 277a, 277b are configured to prevent improper assembly (i.e., not alternating) of the conveyor units 202a. Adjacent ones of the conveyor units 202a are configured to be assembled in an alternating arrangement, whereby a first end 204a of the first conveyor unit 202a is aligned with (i.e., couples to the same track member 102a) as a second end 206a of an adjacent conveyor unit 202a. The side couplers 277a, 277b prevent improper assembly by creating an interference if adjacent ones of the conveyor units 202a are oriented in the same direction. For example, if assembled improperly, a distal end of one of the second side couplers 277b will abut an outer sidewall surface 240a of an adjacent conveyor unit 202a rather than being received within the corresponding aperture 279a, thereby preventing the conveyor units 202a from being fully assembled and resulting in a gap between adjacent conveyor units 202a.

With continued reference to FIG. 14, each conveyor unit 202a includes the first end coupler 216a disposed at the first end 204a and the second end coupler 218a disposed at the second end 206a. Here, each end coupler 216a, 218a is integrally formed with the conveyor frame 212a at a respective end of the conveyor frame 212a. Each of the end couplers 216a, 218a includes a coupler base 281a, 281b extending from the base 220a of the frame 212a and a pair of coupler ears 283a, 283b extending from one of the frame sidewalls 221a, 222b. As discussed below, the coupler bases 281a, 281b are formed integrally with the base 220a of the frame 212a and the coupler ears 283a, 283b are formed integrally with the respective sidewalls 221a, 222b, but the coupler ears 283a, 283b are independent of or disconnected from the coupler bases 281a, 281b. This configuration allows the couplers bases 281a, 281b to be formed using a stamping process, whereby the coupler elements 281a, 281b, 283a, 283b are cut or stamped from a common sheet of material and then formed into the conveyor frame 212a.

As shown, each coupler base 281a, 281b includes a vertical neck portion extending from the base 220a and a coupler lip extending horizontally (i.e., parallel to the base 220a) from a distal end of the neck portion. The coupler lip defines a length $L_{281a}$, $L_{281b}$ of the respective coupler bases 281a, 281b formed at each end 204a, 206a. For example, as shown in FIG. 14, the length $L_{281a}$ of the coupler base 281a formed at the first end 204a is greater than the length $L_{281b}$ of the coupler base 281b formed at the second end 206a, whereby when adjacent conveyor units 202a are assembled to the track member 102a, the lips of the coupler base 281a, 281b interface with a corresponding coupler channels 143 formed in the track member 102a.

Each of the coupler ears 283a, 283b forms a first coupling element of a coupling system for securing the end 204a, 206a of the conveyor unit 202a to the track member 102a. Here, the each of coupler ears 283a, 283b includes a neck portion 288a having a proximal end attached to one of the frame sidewalls 221a, 222a and a head portion 290a attached to a distal end of the neck portion 288 and having a greater thickness $T_{290}$ than the neck portion 288. In the illustrated example, the coupling system is configured as a T-slot whereby each of the coupler ears 283a, 283b defines the male portion of the T-slot interface while the conveyor track 104a defines the corresponding female portion (i.e., the T-slot). However, the coupling system may be inverted such that the male portion of the interface is provided on the conveyor track 104a and the female portion of the interface is provided on end coupler 216a, 218a. Lengths that each of the coupler ears 283a, 283b extend from each end 204a, 206a of the conveyor frame 212a correspond to the lengths $L_{281a}$, $L_{281b}$ of the coupler bases 281a, 281b, whereby respective pairs of coupler bases 281a, 281b, and coupler ears 283a, 283b corresponding to each end 204a, 206a cooperate to provide adjacent ones of the conveyor units 202a with offset longitudinal positions when assembled to the track members 102a. Offsetting the rollers 214 of adjacent conveyor units 202a increases the overall support provided by the support bed 16 by increasing the number contact points along the length of the conveyor system 200a. In other words, offsetting the rollers 214 provides twice as many contact points for supporting merchandise compared to having the rollers 214 of adjacent conveyor units 202a aligned with each other.

With reference to FIGS. 16-18, the conveyor frame 212a may be formed as a modular structure including a first end segment 291a, one or more intermediate segments 291b, and a second end segment 291c. As described in greater detail below with respect to FIG. 18, the segments 291a-291c are coupled to each other at segment joints defined by a female segment end 292 on a first one of the frame segments 291a-291c and a male segment end 293 on another one of the frame segments 291a-291c. Particularly, the first end segment 291a extends from the first end 204a including the first end coupler 216a to an opposite end defining a female segment end 292. Conversely, the second end segment 291c extends from the second end 206a including the second end coupler 218a to an opposite end defining a male segment end 293. The intermediate segment 291b extends from a first end defining a female segment end 292 to a second end defining a male segment end 293. Thus, the female segment end 292 of the intermediate segment 291b is configured to interface with the male segment end 293 of the second end segment 291c and the male segment end 293 of the intermediate segment 291b is configured to interface with the female segment end 292 of the first end segment 291a. Additional intermediate segments 291b may be added between the first end segment 291a and the second end segment 291c to modify an overall length of the conveyor frame 212a.

Turning to FIG. 18, one of the intermediate segments 291b is shown and includes a female segment end 292 and a male segment end 293. The female segment end 292 is defined by terminal ends of the base 220a and each of the frame sidewalls 221a, 222a. At the opposite end, the male segment end 293 includes one or more frame couplers 294, 295 configured to overlap the female segment end 293 of an adjacent segment 291a, 291b, 291c (FIG. 17). The frame couplers 294, 295 include one or more segment lips 294 extending from the base 220a and a pair of segment ears 295 extending from the frame sidewalls 221a, 222a. As shown in FIG. 17, the male segment end 293 includes a pair of the segment lips 294, whereby one of the segment lips extends from the base 220a along the longitudinal direction on each side of the central rib 233a. The segment lips 294 extend horizontal to the base 220a, but are offset in a vertical direction relative to the base 220a so as to overlap the top side 226a of a base 220a of a corresponding female segment end 292 when assembled. Particularly, the segment lips 294 may be offset by the same distance $D_{277b}$ as the second side couplers 277b previously described.

In addition to the segment lips 294, the male segment ends 293 include the segment ears 295 extending from each frame sidewall 221a, 222a. In the illustrated example, each of the segment ears 295 extends along the longitudinal direction from the respective frame sidewall 221a, 222a and is offset outwardly from the outer sidewall surface 242a by a distance corresponding to the thickness of the frame sidewall 221a, 222a. Thus, the segment ears 295 are configured to overlap the outer sidewall surfaces 242a of an adjacent segment 291a, 291b when the conveyor frame 212a is assembled. An upper edge of each of the segment ears 295 includes a recess configured to engage one of the socket bearings 245a of the mating segment 291a, 291b when the conveyor frame 212a is assembled. For example, as shown in FIG. 17, when the conveyor frame 212a is assembled, a socket bearing 245a of the front end segment 291a rests within the recess 295a of the segment ear 295 of the intermediate segment 291b to secure the two segments 291a, 291b in the assembled state.

Each of the frame segments 291a-291c may be manufactured as a unitary body. For example, all of the features of the frame segments 291a, 291c, socket bearings 245a, the side couplers 277a, 277b, the segment lips 294, and the segment ears 295 may be formed in a one or more stamping processes from a single blank or sheet of material. Thus, in addition to providing improved functionality, the design of the frame segments 291a-291c improves manufacturing efficiencies in comparison to systems requiring subsequent assembly steps.

With particular reference to FIGS. 22-27C, another example of a conveyor system 200b is provided. In view of the substantial similarity in structure and function of the components associated with the conveyor systems 200, 200a with respect to the conveyor system 200b, like reference numerals are used hereinafter and in the drawings to identify like components while like reference numerals containing letter extensions are used to identify those components that have been modified.

In the illustrated example, the conveyor system 200b includes a pair of generic conveyor units 202b for the sake of illustrating the unique features of the conveyor system 200b relative to the other examples of conveyor systems described herein. Thus, each of the conveyor frames 212b is provided without any form of end couplers for attaching to a track member. However, the conveyor system 200b may be configured with end couplers according to any of the examples provided herein.

Figure 23:
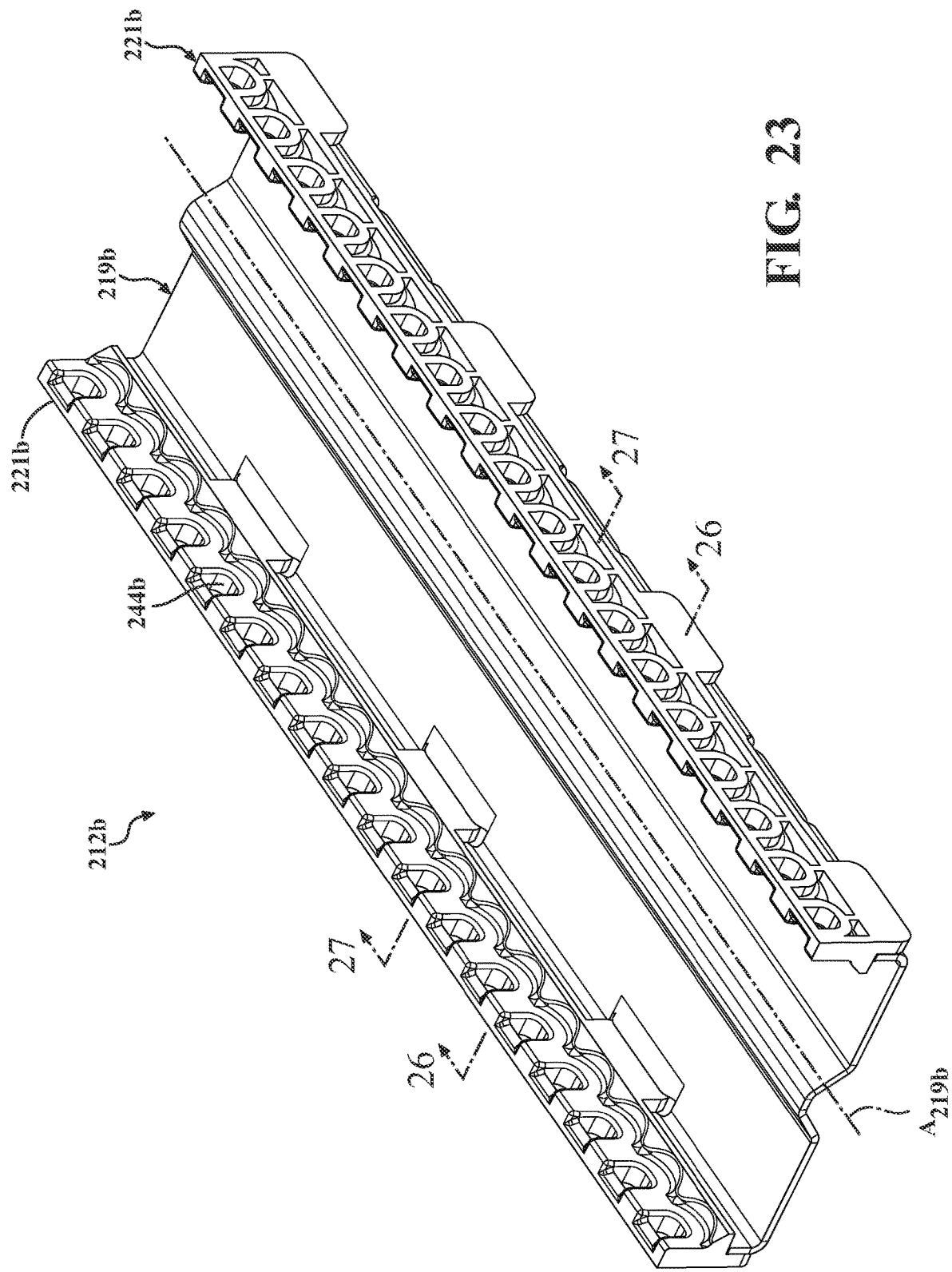
FIG. 23 is a perspective view of a conveyor frame of the shelving system of FIG. 22.
Figure 24:
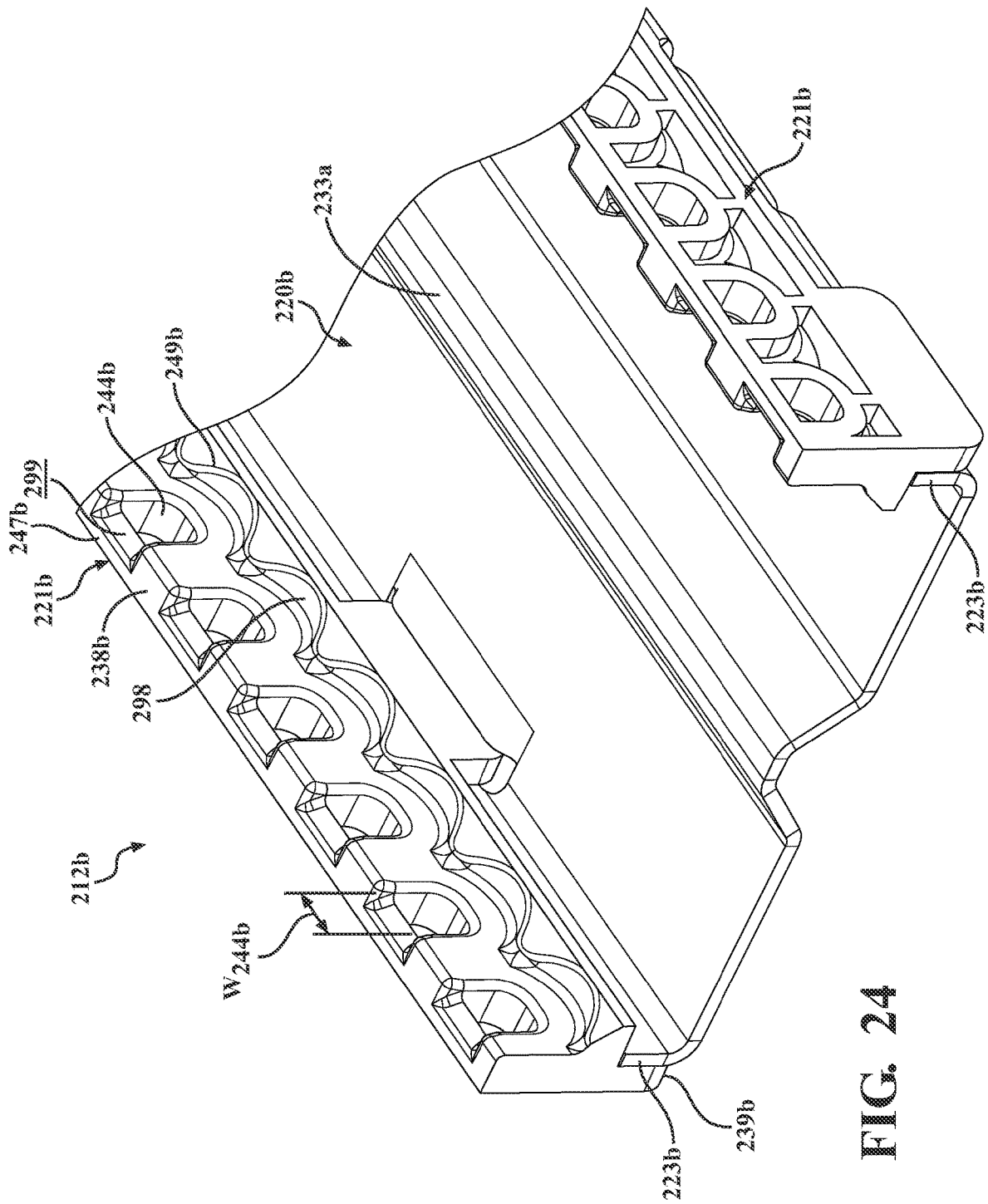
FIG. 24 is an enlarged, partial view of the conveyor frame of FIG. 23.
Figure 25:
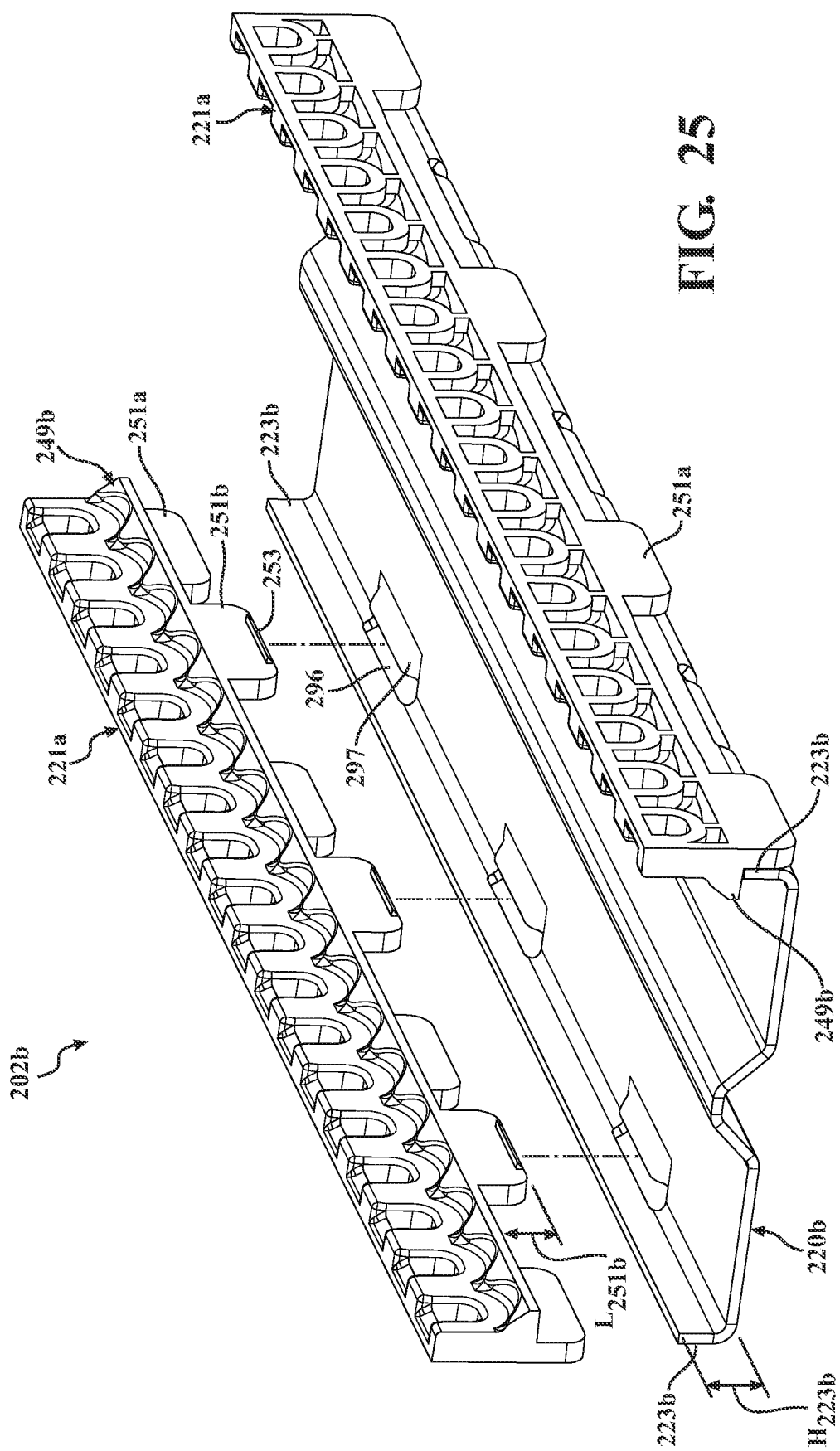
FIG. 25 is an exploded perspective view of the conveyor frame of FIG. 23.

The conveyor frame 212b is provided as a modular structure including a conveyor chassis 219b and a pair of frame sidewalls 221b detachably coupled (i.e., can be detached and reattached without permanent damage to the structure) to the conveyor chassis 219b on opposite sides. As best shown in FIGS. 23-25, the chassis 219b includes the base 220b and a pair of chassis sidewalls 223b extending along a length of the base 220a on opposite sides. Particularly, a first one of the chassis sidewalls 223b extends from the top side 226b of the base 220b along a left side and a second one of the sidewalls 223b extends from the top side 226b of the base along a right side. As shown, the chassis sidewalls 223b are parallel to each to each other and each have a height $H_{223b}$ extending to a distal end of the chassis sidewall 223b.

Figure 27A:
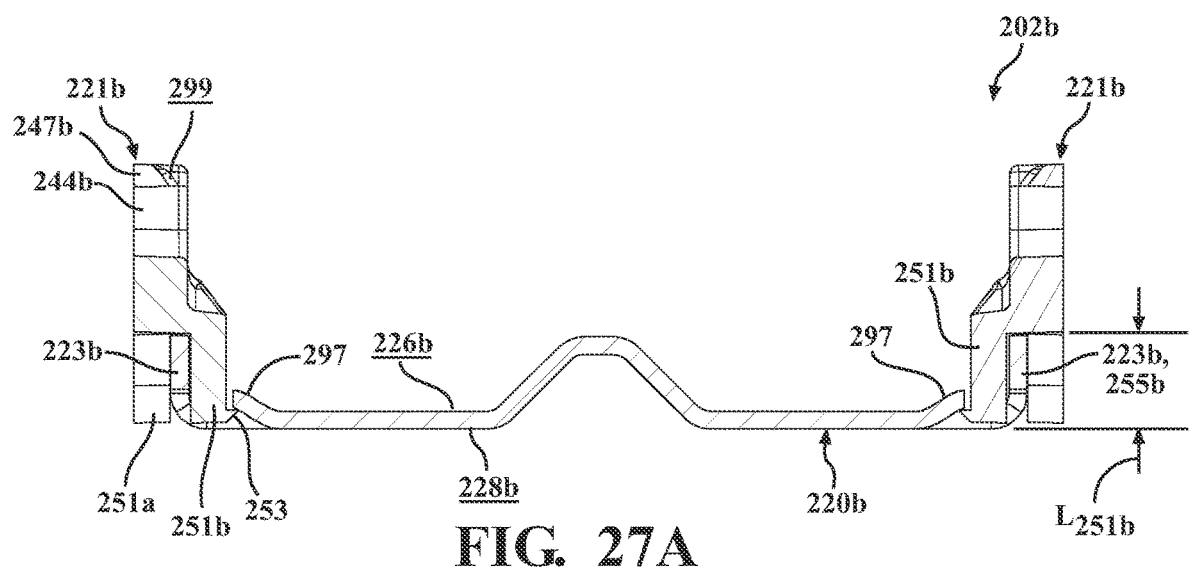
FIG. 27A is cross-sectional view of the intermediate frame segment of FIG. 23, taken at Line 27-27 of FIG. 23.

The base 220b includes a plurality of receptacles 296 configured to interface with a corresponding portion each frame sidewall 221b. In the illustrated example, the receptacles include apertures formed through a thickness of the base 220b adjacent to each chassis sidewall 223b. For example, the base 220b is shown with three receptacles 296 formed along the left chassis sidewall 223b and three receptacles 296 formed along the right chassis sidewall 223b. One or more of the receptacles 296 may include a base retainer 297 configured to interface with a corresponding sidewall retainer 253 of the frame sidewall 221b to secure the frame sidewall 221b to the base 220b. In the illustrated example, the base retainer 297 includes a flange 297 formed adjacent to an inner side (i.e., closer to the longitudinal axis $A_{219b}$) of the receptacle 296. As shown in FIG. 27A, the flange 297 is vertically offset from the bottom side 228b of the base 220b such that a bottom edge of the flange 297 is spaced apart from a shelf support surface when the base 220b is installed a shelf support bed 16. This space or gap between the bottom of the flange 297 and the shelf provides an area in which the sidewall retainer 253 is received to engage the bottom of the flange 297. Optionally, the flange 297 may be unitarily formed with the base 220a (e.g., via stamping or molding).

With continued reference to FIGS. 24 and 25, each of the frame sidewalls 221b is configured to be selectively attached to the base 220b along one of the chassis sidewalls 223b. Generally, the frame sidewalls 221b may be described as having a height extending in a vertical direction from the distal end 238b at the top to a proximal end 239b. The distal end 238b is generally configured to receive the rollers 214 and the proximal end 239b is generally configured for attaching to the base 220b.

Figure 26:
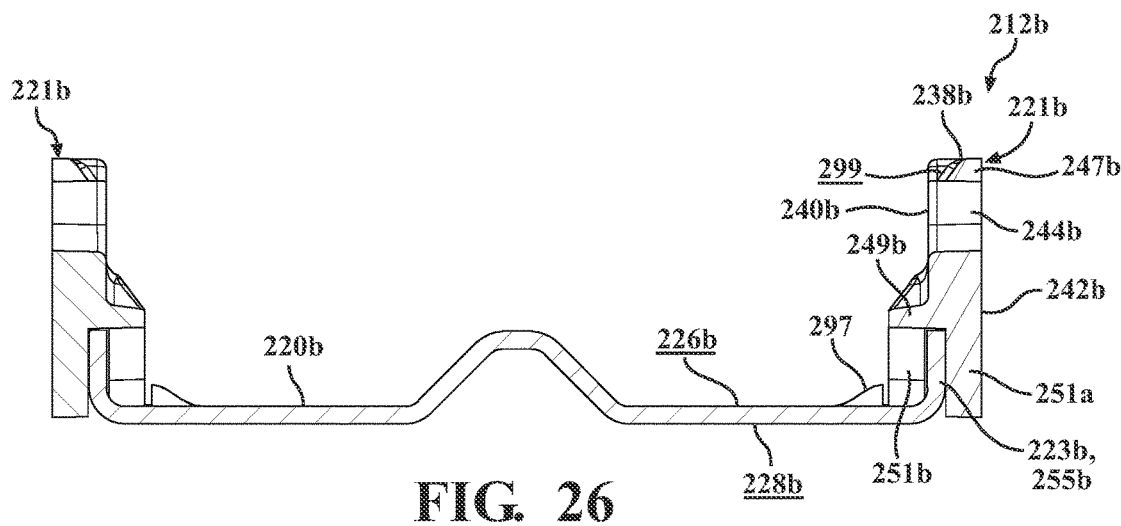
FIG. 26 is a cross-sectional view of the intermediate frame segment of FIG. 23, taken at Line 26-26 of FIG. 23.

As shown in FIG. 25, the proximal end 239b includes a plurality of tabs 251a, 251b arranged along a length of the frame sidewall 221b. The tabs 251a, 251b are configured to interface with the chassis sidewalls 223b and the receptacles 296 to attach and secure the frame sidewalls 221b to the base 220b. The tabs 251a, 251b include a plurality of outer tabs 251a and a plurality of inner tabs 251b. As best shown in FIG. 26, the inner tabs 251b are spaced inwardly from the outer tabs 251a to define a sidewall channel 255b configured to mate with the chassis sidewall 223b. In the illustrated example, the outer tabs 251a are substantially flush with and define a portion of the outer sidewall surface 242b, while the inner tabs 251b are inwardly offset from the inner sidewall surface 241b to define the channel 255b.

When the frame sidewalls 221b are assembled to the base 220b, the outer tabs 251a and the inner tabs 251b are alternatingly arranged along opposite sides of each chassis sidewall 223b, whereby the tabs 251a, 251b straddle the chassis sidewall 223b. The inner tabs 251b have a length $L_{251b}$ that corresponds to the height $H_{223b}$ of the chassis sidewall 223b, whereby a distal end of each inner tab 251b extends into one of the receptacles 296 and below the flange 297. The inner tabs 251b may include the sidewall retainer 253 configured to engage the flange 297 adjacent to each receptacle 296. As shown, the sidewall retainer 253 includes a tooth 253 formed on an inner surface (i.e., facing the center of the base 220b) at the distal end of inner tab 251b, whereby the tooth 253 is configured to "catch" the bottom edge of the flange 297 when the frame sidewall 221b is fully engaged with the base 220b.

With continued reference to FIG. 25, the frame sidewalls 221b may define an inner shoulder 249b extending along a length of the frame sidewall 221b. The inner shoulder 249b is formed along the inner sidewall surface 240a and provides a structural interface between the inner sidewall surface 240a and the inner tabs 251b. Namely, the inner tabs 251b depend from a bottom side of the inner shoulder 249b while an upper surface of the inner shoulder 249b converges with the inner sidewall surface 240a. Optionally, the inner shoulder 249b may include a plurality of recesses 298 each configured to receive an end portion of an outer circumference of a roller 214.

Figure 27B:
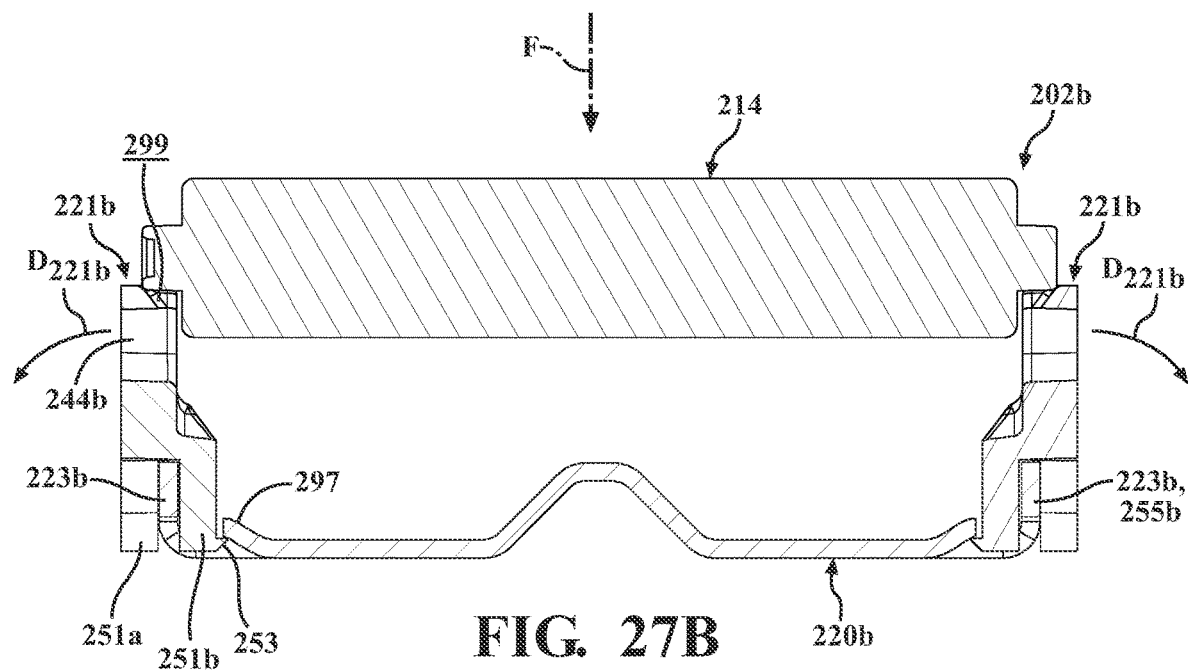
FIGS. 27B and 27C are cross-sectional views taken along Line 27-27 of FIG. 23, showing steps for installing a roller into the intermediate frame segment of FIG. 23.
Figure 27C:
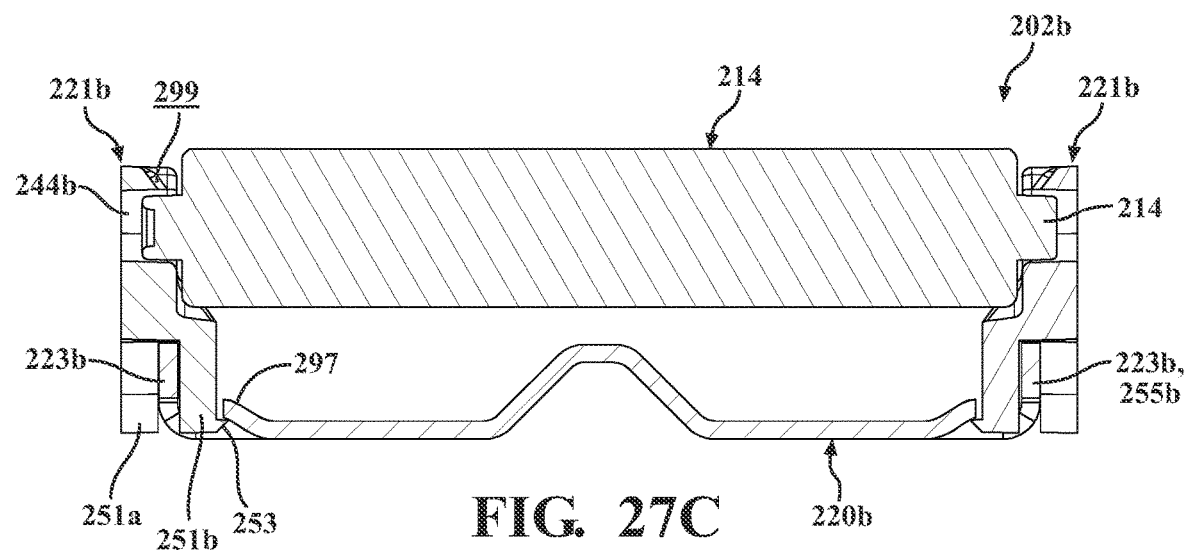
Figure 28:
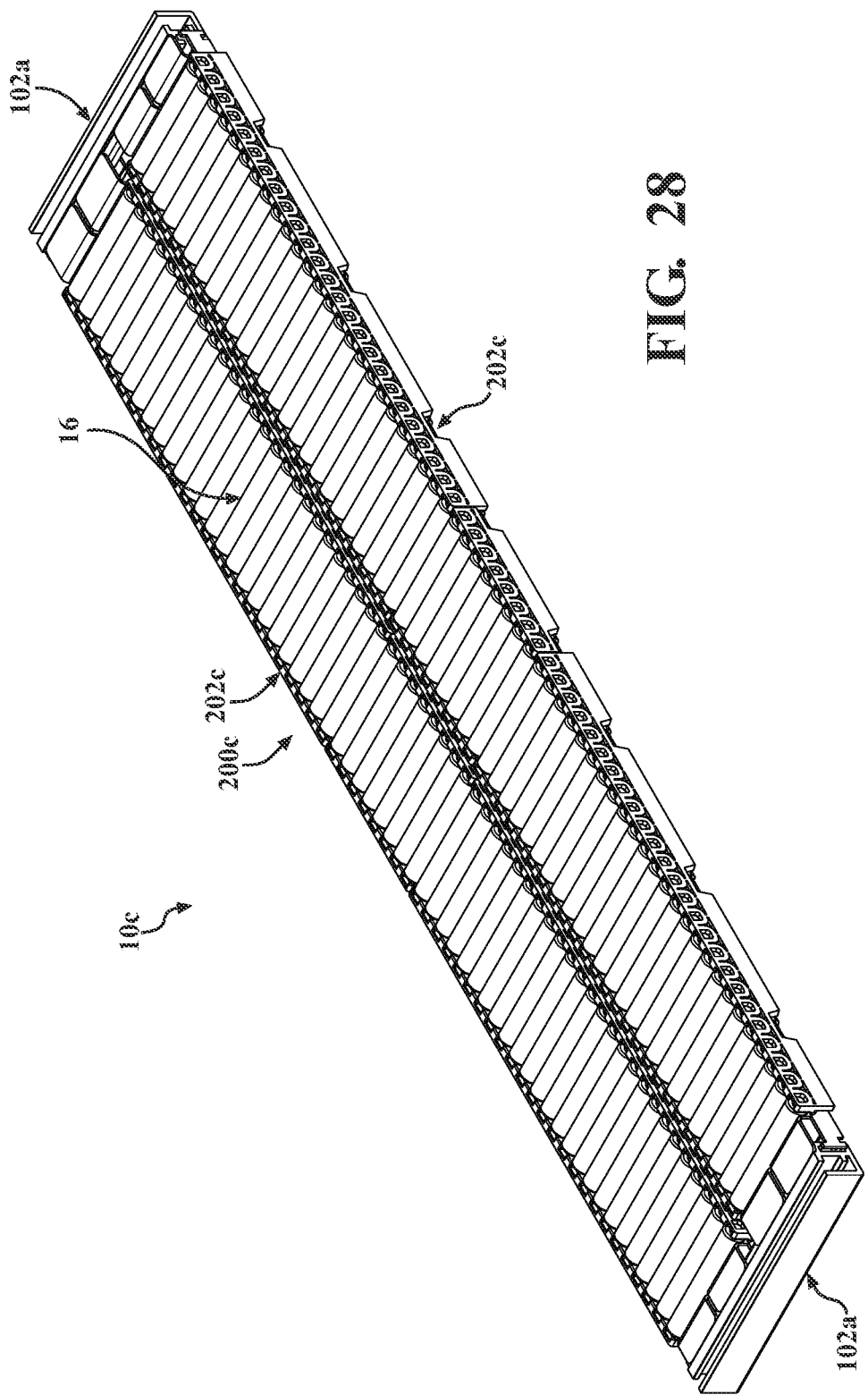
FIG. 28 is a perspective view of another example of a shelving system according to the principles of the present disclosure.
Figure 29:
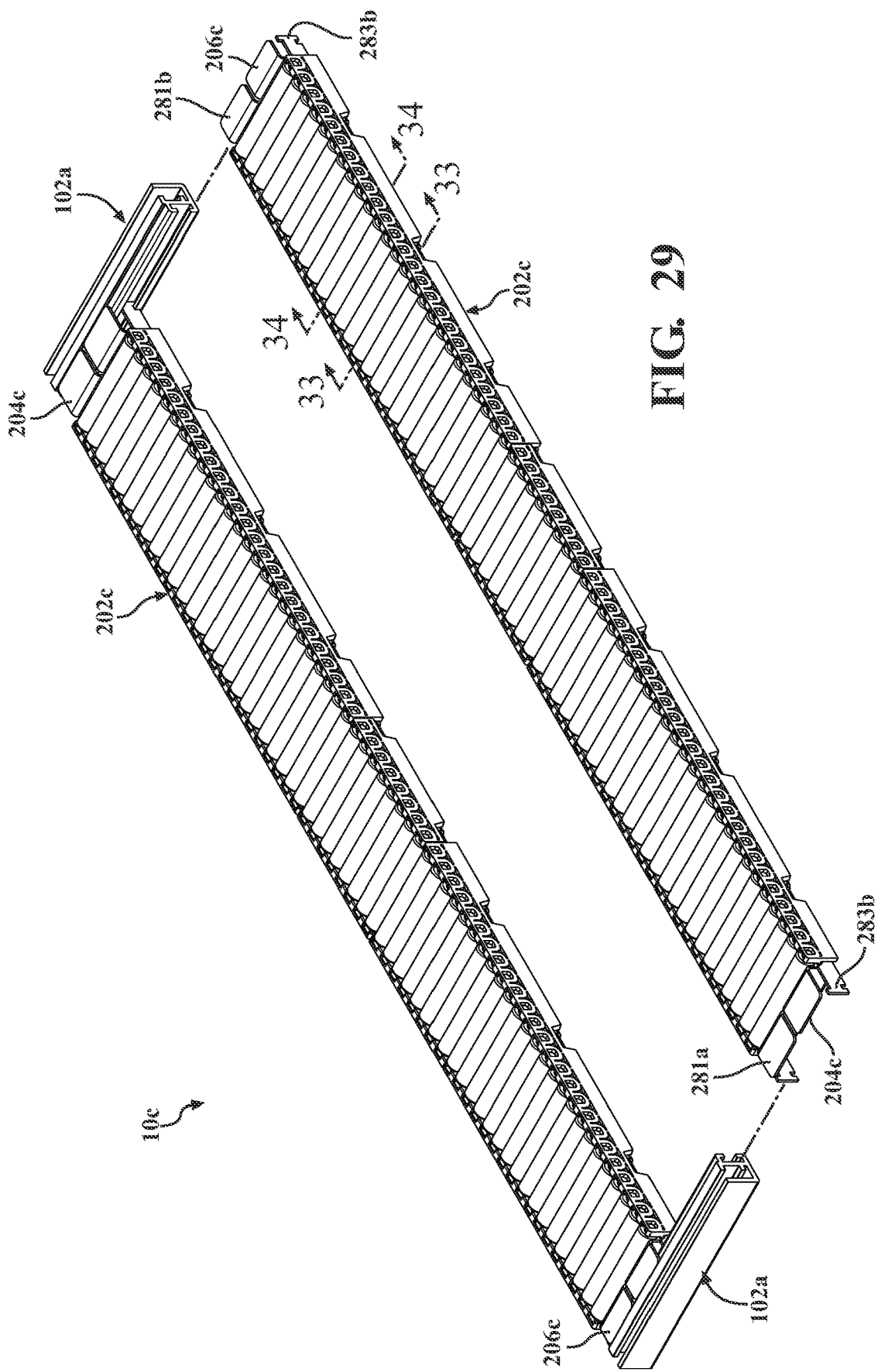
FIG. 29 is an exploded perspective view of the shelving system of FIG. 28.

Referring to FIG. 24, the frame sidewalls 221b include a plurality of sockets 244b arranged in series along the lengthwise direction. Each of the sockets 244b defines an opening at the distal end 238b of the frame sidewall 221b for receiving one of the shafts 215 of one of the rollers 214. In the illustrated example, each socket 244b includes an elongate lip element 247b extending across the opening of the socket 244b at the distal end 238b. The lip element 247b is offset towards and flush with the outer sidewall surface 242b whereby an inner guide surface 299 of the lip element 247b is offset or recessed from the inner sidewall surface 240b. Furthermore, the inner guide surface 299 is formed at an oblique angle relative to the inner sidewall surface 240b and defines a ramp or biasing surface for guiding and retaining a roller shaft 215 into the socket 244. For example, as shown in FIGS. 27A-27C, when the frame sidewalls 221b are installed on the base 220b, a distance between the lip elements 247b of the opposite sidewalls 221b may be less than an overall length of the roller 214, whereby the shafts 215 of the roller cannot freely drop into the sockets 244b. Thus, a roller 214 may be installed by applying a downward force F to press the shafts 215 of the roller 214 between the lip elements 247b, whereby the ends of the roller shafts 215 bias against the angled inner guide surface 299 of the lip element 247b to bias or flex the distal ends 238 of the frame sidewalls 221b outwardly in the direction $D_{221b}$ (FIG. 27B). Once the roller shafts 215 are seated within the sockets 244, the resiliency of the frame sidewalls 221b causes the distal ends 238 to return inwardly, whereby the shafts 215 of the rollers are captured within the sockets 244b by a bottom side of the lip elements 247b. In this example, the sockets 244b have a substantially constant width $W_{244b}$ that is sized to provide a slip fit with the roller shafts 215.

With particular reference to FIGS. 28-34, another example of a shelving system 10c is provided. In view of the substantial similarity in structure and function of the components associated with the shelving systems 10, 10a, 10b with respect to the shelving system 10c, like reference numerals are used hereinafter and in the drawings to identify like components while like reference numerals containing letter extensions are used to identify those components that have been modified.

In the illustrated example, the shelving system 10c includes a conveyor system 200c including one or more conveyor units 202c assembled to a track system 100a in a similar manner as in the shelving system 10a described previously. Here, each conveyor unit extends from a first end 204c to a second end 206c. As shown, the conveyor system 200c includes a pair of conveyor units 202c for the sake of illustrating the unique features of the conveyor system 200c relative to the other examples of conveyor systems described herein. Thus, each of the conveyor frames 212c is provided within any form of end couplers for attaching to a track member. However, the conveyor system 200c may be configured with end couplers according to any of the examples provided here.

Figure 30:
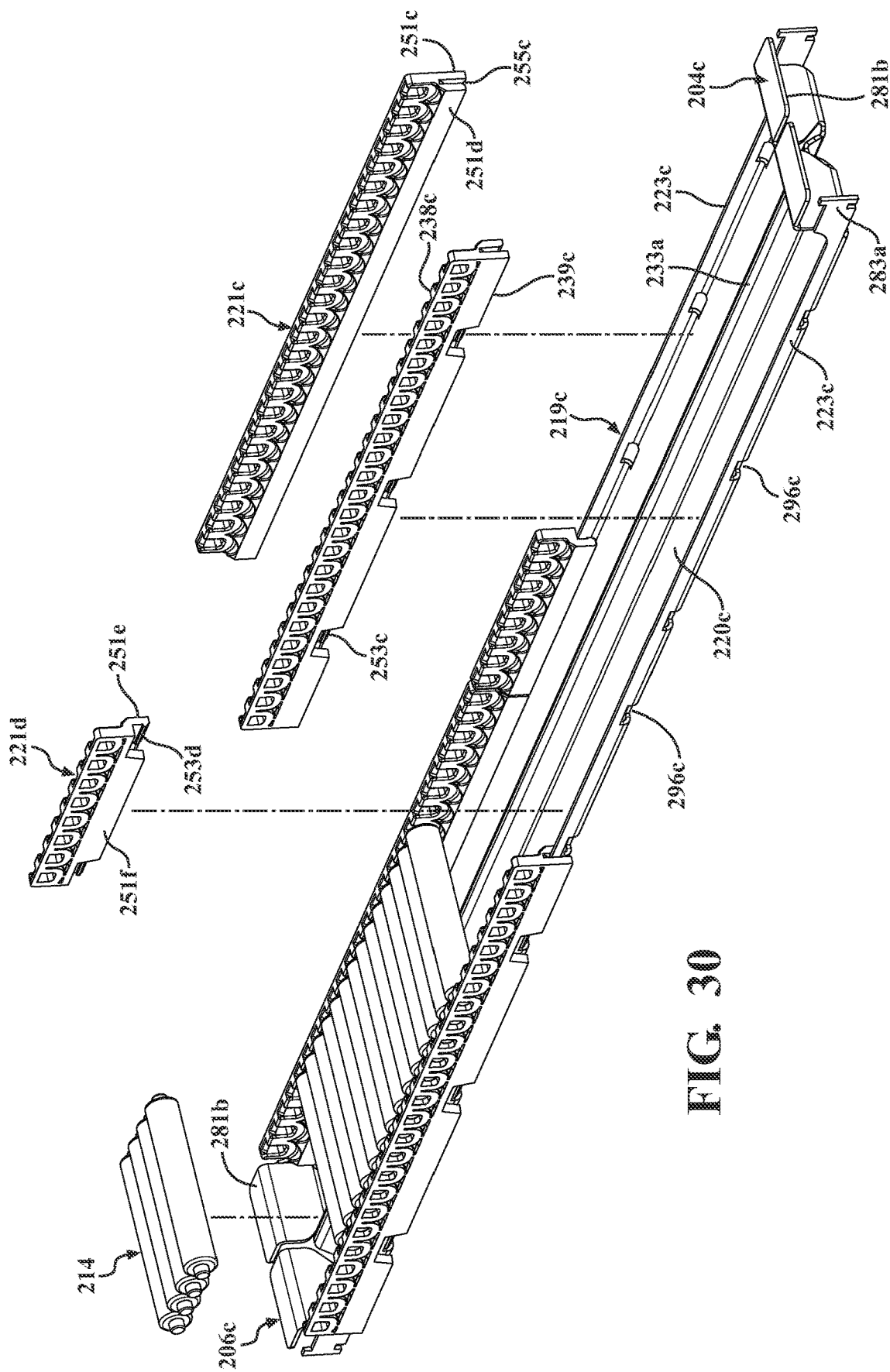
FIG. 30 is an exploded perspective view of a conveyor unit of the shelving system of FIG. 28.

The conveyor frame 212c is provided as a modular structure including a base 220c and a pair of frame sidewalls 221c, 221d detachably coupled (i.e., can be detached without permanent damage to the structure) to the base 220c on opposite sides. As best shown in FIG. 30, the base 220c may be incorporated in a chassis 219c including a pair of chassis sidewalls 223c extending along a length of the base 220c on opposite sides. Particularly, a first one of the chassis sidewalls 223c extends from the top side 226c of the base 220c along a left side and a second one of the chassis sidewalls 223c extends from the top side 226c of the base along a right side. As shown, the chassis sidewalls 223c are parallel to each to each other and each have a height $H_{223c}$ extending to a distal end of the chassis sidewall 223c.

The base 220c includes a plurality of receptacles 296c configured to interface with a corresponding portion each frame sidewall 221c, 221d. In the illustrated example, the receptacles 296c include apertures formed through a thickness of the base 220c adjacent to each chassis sidewall 223c. Particularly, each of the receptacles 296c includes a first portion formed through the base 220c and a second portion formed through the chassis sidewall 223c, whereby an upper edge of the receptacle 296c formed in the chassis sidewall 223c defines a base retainer 297c (FIG. 33) configured to interface with a corresponding retainer 253c, 253d of one of the frame sidewalls 221c.

Figure 31:
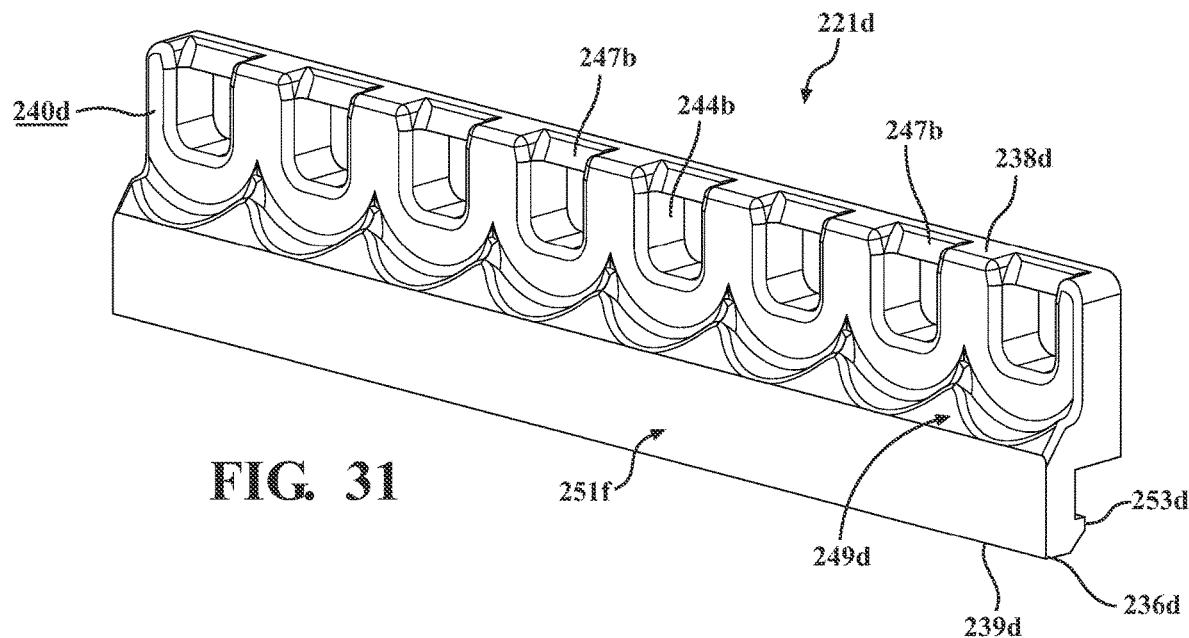
FIG. 31 is an inner perspective view of a frame sidewall of the shelving system of FIG. 28.
Figure 32:
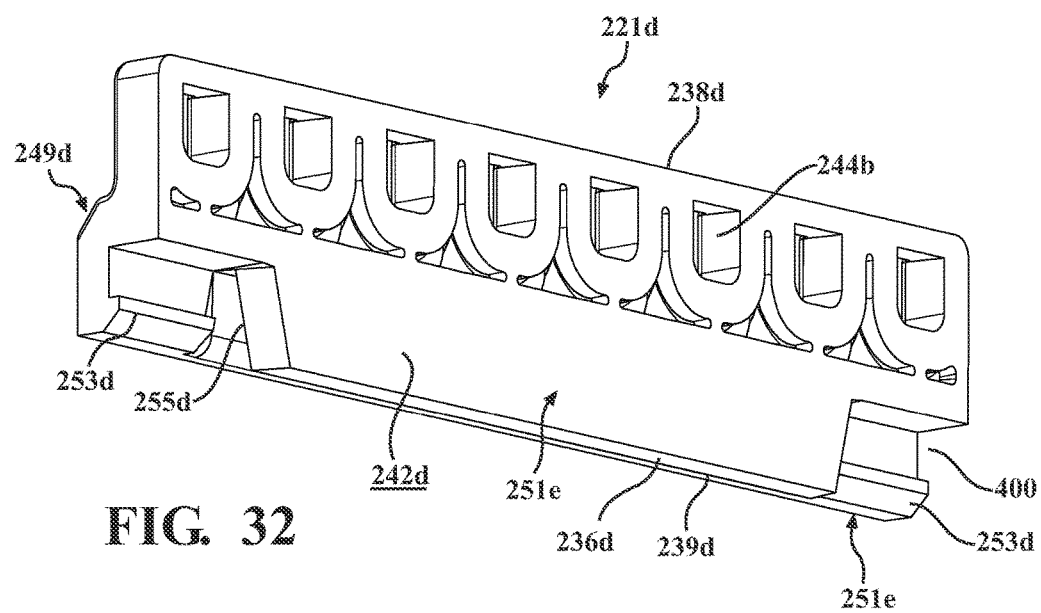
FIG. 32 is an outer perspective view of the frame sidewall of FIG. 31.
Figure 33:
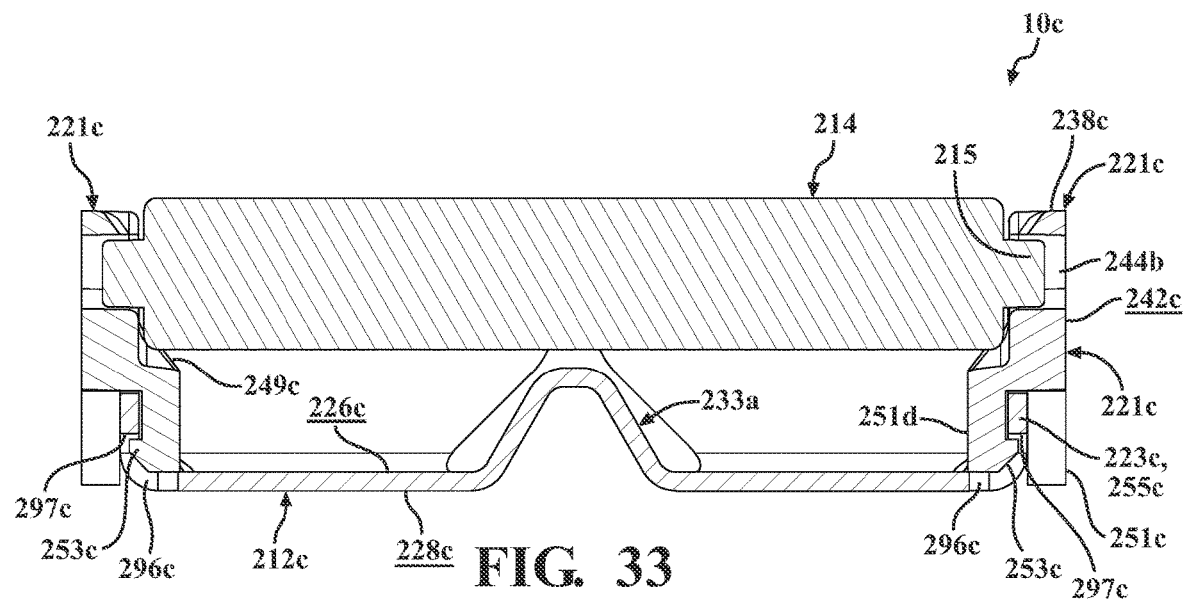
FIG. 33 is a cross-sectional view of the conveyor unit of FIG. 30, taken at Line 33-33 of FIG. 29.
Figure 34:
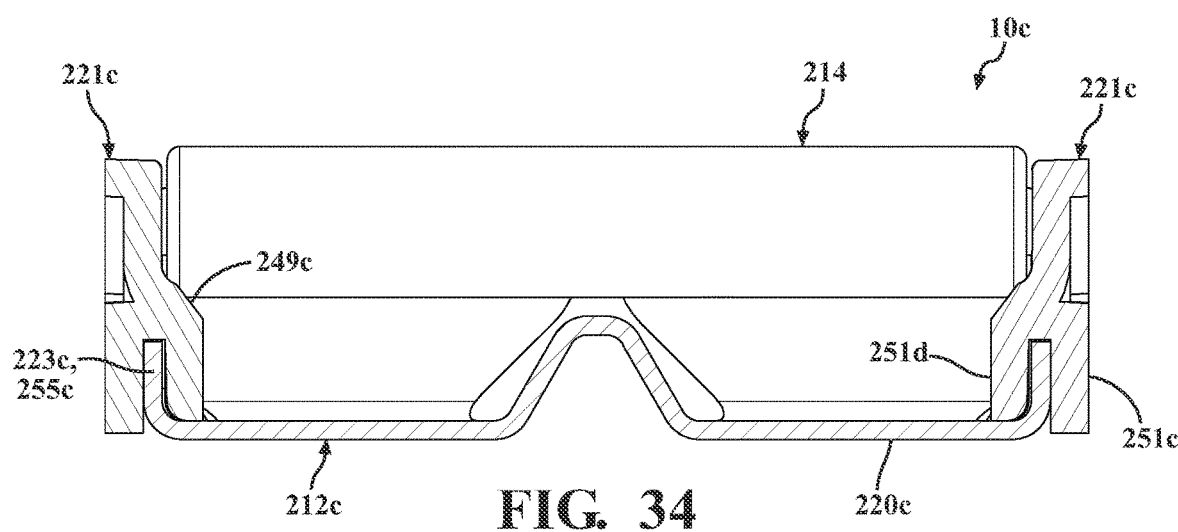
FIG. 34 is a cross-sectional view of the conveyor unit of FIG. 30, taken at Line 34-34 of FIG. 29.

With continued reference to FIGS. 30-32, each of the frame sidewalls 221c, 221d is configured to be selectively attached to the base 220c along one of the chassis sidewalls 223c. In the illustrated example, the frame sidewalls 221c, 221d include primary frame sidewalls 221c and secondary frame sidewalls 221d having a different length than the primary frame sidewalls 221c. For example, the secondary frame sidewalls 221d may have a shorter length than the primary frame sidewalls 221c. While the lengths of the frame sidewalls 221c, 221d are different, the features and functions of the sidewalls 221c, 221d are substantially the same. Generally, a height of the frame sidewalls 221c, 221d may be described as extending in a vertical direction from the distal end 238c, 238d at the top to a proximal end 239c, 239d at the bottom. The distal end 238c, 238d is generally configured to receive the rollers 214 and the proximal end 239c, 239d is generally configured for attaching to the chassis 219c.

As shown in FIGS. 30-32, the proximal ends 239c, 239d of the frame sidewalls 221c, 221d include a plurality of tabs 251c-251e arranged along a length of the frame sidewall 221c, 221d. The tabs 251c-251e are configured to interface with the chassis sidewalls 223c and the receptacles 296c to attach the frame sidewalls 221c to the base 220c. Each frame sidewall 221c, 221d includes one or more outer tabs 251c, 251e and one or more inner tabs 251d, 251f As best shown in FIG. 32 with respect to the secondary frame sidewall 221d, the inner tabs 251d, 251f are spaced inwardly from the outer tabs 251c, 251e to define a sidewall channel 255c, 255d configured to mate with the chassis sidewall 223c. In the illustrated example, the outer tabs 251c, 251e are substantially flush with and define a portion of the outer sidewall surface 242c, 242d, while the inner tabs 251d, 251f are inwardly offset from the inner sidewall surface 241b to define the channel 255c, 255d.

When the frame sidewalls 221c, 221d are assembled to the base 220c, the outer tabs 251c, 251e and the inner tabs 251e, 251f are alternatingly arranged along opposite sides of each chassis sidewall 223c, whereby the respective pairs of tabs 251c-251f of each frame sidewall 221c, 221d straddle the chassis sidewall 223c. The outer tabs 251c, 251e may include one or more sidewall retainers 253c, 253d configured to engage the base retainer 297c defined by the receptacle 296c. With reference to FIG. 32, an example of the outer tab 251e of the secondary frame sidewall 221d is provided for illustration. As shown, the sidewall retainers 253c, 253d include a plurality of teeth 253c, 253d formed on an outer surface (i.e., facing away from the center of the base 220c) at the distal end of inner tab 251e, whereby the tooth 253c, 253d is configured to "catch" the base retainer 297c (i.e., the bottom edge of the chassis sidewall 223c, 253d at the receptacle 296c) when the frame sidewall 221c, 221d is fully engaged with the base chassis 219c. As shown in FIG. 32, the outer tabs 251d, 251f include notches or reliefs 400 that are aligned with each of the teeth 253c, 253d. Thus, when the frame sidewalls 221c, 221d are assembled to the base (FIG. 30) and the teeth 253c, 253d are engaged with the receptacles 296c, the teeth 253c, 253d remain exposed and accessible via the notches or reliefs 400 formed in the inner tabs 251d, 221f, whereby the teeth 253c, 253d can be disengaged from the receptacles 296c through the notches to detach the frame sidewalls 221c, 221d from the base 220c.

The frame sidewalls 221c, 221d may define an inner shoulder 249c, 249d extending along a length of the frame sidewall 221c, 221d. The inner shoulder 249c, 249d is formed along the inner sidewall surface 240c, 240d and provides an attachment interface between the inner sidewall surface 240c, 240d and the inner tabs 251d, 251e. Namely, the inner tabs 251d, 251e depend from a bottom side of the inner shoulder 249c, 249d while an upper surface of the inner shoulder 249c, 249d converges with the inner sidewall surface 240c, 240d. Optionally, the inner shoulder 249c, 249d may include a plurality of recesses 298 each configured to receive an end portion of an outer circumference of a roller 214.

Referring to FIGS. 30-34, the frame sidewalls 221c, 221d include a plurality of the sockets 244b as previously described with respect to the frame sidewalls 221b. Thus, a roller 214 may be installed by applying a downward force F to press the shafts 215 of the roller 214 between the lip elements 247b, whereby the ends of the roller shafts 215 bias against the angled inner guide surface 299 of the lip element 247b to bias or flex the distal ends 238 of the frame sidewalls 221c outwardly in the direction. Once the roller shafts 215 are seated within the sockets 244b, the resiliency of the frame sidewalls 221c causes the distal ends 238 to return inwardly, whereby the shafts 215 of the rollers are captured within the sockets 244b by a bottom side of the lip elements 247b. In this example, the sockets 244b have a substantially constant width $W_{244b}$ that is sized to provide a slip fit with the roller shafts 215.

The conveyor units 202a are assembled by initially aligning the channels 255c, 255d formed in the proximal ends 239c, 239d of the frame sidewalls 221c, 221d with the distal ends of the chassis sidewalls 223c. Additionally, the sidewall retainers 253c, 253d are vertically aligned with the respective receptacles 296c. The sidewalls 221c, 221d are then lowered onto the chassis sidewalls 223c such that the chassis sidewalls 223c are received within the channels 255c, 255d and the sidewall retainers 253c, 253d "snap" into the receptacles 296c. Here, a top edge of the sidewall retainer 253c, 253c engages the lower edge defining the base retainer 297c to secure a vertical position of the frame sidewall 221c, 221d. The rollers 214 are then assembled to the conveyor unit in the manner described above.

The frame chassis 219c may include a first material, such as a metal, and the frame sidewalls 221c, 221d may include a second material, such as a polymeric material. Thus, the features of the frame chassis 219c may be formed using metal stamping processes and the features of the frame sidewalls 221c, 221d may be formed using polymer molding processes, such as injection molding. By providing a hybrid structure including metal and polymers, material properties and manufacturing processes are improved by providing the chassis 219c with increased strength and simplified manufacturing while still allowing the frame sidewalls 221c, 221d to be formed with more complex geometries permitted by polymer molding.

Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or feature is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

What is claimed is:

1. A conveyor system for a retail shelf, the conveyor system comprising: a conveyor frame including (a) a frame base, (b) a pair of parallel frame sidewalls each extending from a top side of the frame base to a distal end defining a plurality of sockets, each of the sockets (i) defining a socket bearing configured to support a corresponding roller shaft and (ii) further including a lip element extending across an opening at the distal end, and (c) at least one end coupler attached at an end of the conveyor frame and including at least one coupler ear integrally formed with one of the frame sidewalls and coupler base integrally formed with the frame base, the coupler ear being independent from the coupler base.

2. The conveyor system of claim 1, further comprising a track system including a track member slidably coupled to the end coupler.

3. The conveyor system of claim 2, wherein the conveyor frame includes a plurality of frame segments each defining a portion of a length of the conveyor frame.

4. The conveyor system of claim 3, wherein the plurality of frame segments comprises:
   a first end segment extending from a first end including the end coupler to a second end defined by the frame base and the frame sidewalls; and
   a second end segment extending from a third end including a frame coupler configured to overlap the second end of the first end segment when the conveyor frame is in an assembled state.

5. The conveyor system of claim 1, wherein the lip element is recessed from an inner sidewall surface of each of the sidewalls.

6. The conveyor system of claim 1, wherein the lip element is arcuate.

7. The conveyor system of claim 1, wherein the conveyor frame includes a first end including a first track coupling member.

8. The conveyor system of claim 1, further comprising a plurality of roller units each including a first roller shaft at a first end and a second roller shaft at an opposite second end, wherein a length from the first end to the second end is greater than a distance between a first lip element on a first one of the frame sidewalls and a second lip element on the other one of the frame sidewalls.

9. A conveyor system for a retail shelf, the conveyor system comprising:
   a conveyor chassis including a base, a chassis sidewall extending a first height from the base, and a plurality of receptacles formed in at least one of the base and the chassis sidewall; and
   a frame sidewall formed separately from the conveyor chassis and including a proximal end defining a sidewall channel configured to receive the chassis sidewall, an opposite distal end including a plurality of sockets, and a plurality of tabs configured to be at least partially received within the receptacles when the sidewall channel receives the chassis sidewall, the plurality of tabs including a plurality of inner tabs extending from a first side of the frame sidewall and a plurality of outer tabs extending from an opposite second side of the frame sidewall and separated from the inner tabs by the sidewall channel.

10. The conveyor system of claim 9, wherein at least one of the tabs includes a sidewall retainer configured to engage the chassis at one of the receptacles.

11. The conveyor system of claim 10, wherein the chassis includes a base retainer configured to interface with the sidewall retainer.

12. The conveyor system of claim 11, wherein the base retainer includes a flange extending from a top side of the base.

13. The conveyor system of claim 9, wherein the base includes a metallic material and the frame sidewall includes a polymeric material.

14. The conveyor system of claim 9, wherein the conveyor chassis includes at least one end coupler attached at an end of the conveyor chassis.

15. The conveyor system of claim 14, wherein the end coupler includes at least one coupler ear integrally formed with one of the chassis sidewalls and at least one coupler base integrally formed with the frame base, the at least one coupler ear being independent from the coupler base.

16. A conveyor system for a retail shelf, the conveyor system comprising:
   a conveyor chassis including a base and a chassis sidewall extending a first height from the base; and
   a frame sidewall formed separately from the chassis and including a proximal end defining a sidewall channel configured to receive the chassis sidewall and an opposite distal end including a plurality of sockets,
   wherein the base includes a metallic material and the frame sidewall includes a polymeric material.

* * * * *